(12) United States Patent
Zhou et al.

(10) Patent No.: US 12,486,744 B2
(45) Date of Patent: Dec. 2, 2025

(54) METHODS FOR OPTIMIZING MULTI-CYCLE PRESSURE- SEPARATED WATER INJECTION IN OILFIELDS BASED ON IMPROVED BUTTERFLY ALGORITHMS

(71) Applicant: SOUTHWEST PETROLEUM UNIVERSITY, Sichuan (CN)

(72) Inventors: Jun Zhou, Chengdu (CN); Shitao Liu, Chengdu (CN); Guangchuan Liang, Chengdu (CN); Ye Shi, Chengdu (CN); Jinghong Peng, Chengdu (CN); Longyu Chen, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 19/182,575

(22) Filed: Apr. 17, 2025

(65) Prior Publication Data
US 2025/0327391 A1   Oct. 23, 2025

(30) Foreign Application Priority Data
Apr. 23, 2024   (CN) .......................... 202410493404.2

(51) Int. Cl.
E21B 43/20   (2006.01)
(52) U.S. Cl.
CPC .......... *E21B 43/20* (2013.01); *E21B 2200/20* (2020.05)
(58) Field of Classification Search
CPC ............................. E21B 43/20; E21B 2200/20
USPC ............................................................ 703/2
See application file for complete search history.

(56) References Cited

FOREIGN PATENT DOCUMENTS

| | | |
|---|---|---|
| CN | 110795893 A | 2/2020 |
| CN | 111242388 A | 6/2020 |
| CN | 113700458 A | 11/2021 |
| CN | 115522899 A | 12/2022 |
| CN | 117372080 A | 1/2024 |
| KR | 100667188 B1 | 1/2007 |

OTHER PUBLICATIONS

Ma, Yuxin, Xinyu Liu, and Peng Shao. "A Multi-Strategy Improved Butterfly Optimization Algorithm." 2023 International Conference on New Trends in Computational Intelligence (NTCI). vol. 1. IEEE, 2023. (Year: 2023).*

(Continued)

*Primary Examiner* — John E Johansen
(74) *Attorney, Agent, or Firm* — PORUS IP LLC

(57) ABSTRACT

Disclosed is a method for optimizing multi-cycle pressure-separated water injection in an oilfield based on an improved butterfly algorithm. The method includes: S1: obtaining basic data of a target water injection pipeline network; S2: constructing an objective function for a water injection scheme optimization model considering multi-cycle pressure-separated water injection; S3: establishing constraints to construct the water injection scheme optimization model considering multi-cycle pressure-separated water injection; and S4: solving the water injection scheme optimization model considering multi-cycle pressure-separated water injection using the improved butterfly algorithm to generate a multi-cycle pressure-separated water injection optimization scheme.

9 Claims, 6 Drawing Sheets

(56) References Cited

OTHER PUBLICATIONS

Fatemi, S. Mobeen, and Mehran Sohrabi. "Cyclic Hysteresis in Three-Phase Relative Permeability Applicable to WAG Injection: Water-Wet and Mixed-Wet Systems under Low Gas/Oil IFT." SPE Annual Technical Conference and Exhibition?. SPE, 2012. (Year: 2012).*
Zhang, Liang. "Discussion on influencing factors of oilfield periodic water injection development." AIP Conference Proceedings. vol. 2066. No. 1. AIP Publishing LLC, 2019. (Year: 2019).*
First Office Action in Chinese Application No. 202410493404.2 mailed on Nov. 29, 2024, 16 pages.
Notification to Grant Patent Right for Invention in Chinese Application No. 202410493404.2 mailed on Feb. 24, 2025, 2 pages.
Liang, Yongtu et al., Optimal operation study on the large-scale looped and branched waterflooding pipeline network system of oilfields, Journal of China University of Petroleum, 42(6): 121-132, 2018.

* cited by examiner

_US 12,486,744 B2_

METHODS FOR OPTIMIZING MULTI-CYCLE PRESSURE- SEPARATED WATER INJECTION IN OILFIELDS BASED ON IMPROVED BUTTERFLY ALGORITHMS

CROSS-REFERENCE TO RELATED APPLICATIONS

This application claims priority to Chinese Patent Application No. 202410493404.2, filed on Apr. 23, 2024, the entire contents of which are hereby incorporated by reference.

TECHNICAL FIELD

The present disclosure relates to the field of oilfield water injection optimization, and in particular, relates to a method for optimizing multi-cycle pressure-separated water injection in an oilfield based on an improved butterfly algorithm.

BACKGROUND

Water injection in an oilfield is one of the most important tasks in oil production and holds significant importance in the development process of the oilfield. Compared to other substances, water flooding has certain advantages. On one hand, the source of water is relatively easy to secure, and injecting water into the oil reservoir is economically feasible. On the other hand, water serves as an ideal medium for displacing oil from a reservoir. Since its first application in the Yumen Oilfield in 1954, water injection development has been successively adopted in major oilfields across the country to achieve long-term stable and high production. Globally, a water injection pressure maintenance technique has been widely used. A coverage area of a water injection network typically spans tens of square kilometers, with a pipeline length reaching hundreds or even thousands of kilometers, and a count of nodes amounting to several thousand. Energy consumption in oil production is a significant component of oil development costs.

The power consumption of the water injection network generally accounts for 33%-56% of a total electricity usage in the oilfield. Apart from the effective energy injected into a formation, the energy of the water injection network is also consumed by motors, water injection pumps, control valves, the network, and wellheads. In an energy consumption distribution of a typical domestic water injection network, motor energy losses account for about 4% of the total energy; water injection pump energy losses account for about 20%; and the energy loss of the water injection network itself accounts for about 20%, while the actual effective energy injected into the formation is only about 56% of the total energy. Conventional water injection typically adopts an average water injection approach within an injection cycle. However, water injection pressures at various injection wells in a water injection region are uneven, with significant differences. To meet a highest water injection pressure demand within the water injection network, an outlet pressure of a water injection station and a demand pressure of each well differ greatly, which may easily lead to significant throttling losses and severe wastage of water injection energy. Multi-cycle pressure-separated water injection refers to a manner of grouping injection wells with similar water injection pressures, equipping them with appropriate water injection pumps and corresponding water injection networks, and performing water injection at different times for different pressure ranges of injection well groups. Adopting multi-cycle pressure-separated water injection can effectively reduce throttling losses caused by the large difference between the outlet pressure of the water injection station and the demand pressure of each well, thereby lowering operating costs of the water injection network.

Therefore, there is an urgent need to propose a method for optimizing multi-cycle pressure-separated water injection in an oilfield based on an improved butterfly algorithm to further reduce the water injection costs of oilfield water injection networks and enhance the economic efficiency of a water injection network operation plan.

SUMMARY

One or more embodiments of the present disclosure provide a method for optimizing multi-cycle pressure-separated water injection in an oilfield based on an improved butterfly algorithm. The method includes: S1, obtaining basic data of a target water injection pipeline network; S2, constructing an objective function for a water injection scheme optimization model considering multi-cycle pressure-separated water injection; S3, establishing constraints to construct the water injection scheme optimization model considering multi-cycle pressure-separated water injection; and S4, solving the water injection scheme optimization model considering multi-cycle pressure-separated water injection using the improved butterfly algorithm to generate a multi-cycle pressure-separated water injection optimization scheme.

In S2, the objective function is configured to minimize an energy consumption cost of a pump unit in the target water injection pipeline network, and the objective function is derived based on work performed by the pump unit on injected water during each water injection period, efficiencies of the pump unit, and an electricity price, represented by:

$$\min F = \sum_{i \in I_1, I_2, I_3} \sum_{j \in J} P_{ele} \frac{\gamma_{ij} Q_{ij} H_{ij} \rho g \Delta T_i}{\alpha \cdot \eta_{bij} \cdot \eta_{cij} \cdot \eta_{dij} \cdot \eta_{pij}},$$

wherein, i denotes an index of a water injection period within a water injection cycle, $I_1$, $I_2$, and $I_3$ denote sets of water injection periods for a low-pressure range water injection well group, a medium-pressure range water injection well group, and a high-pressure range water injection well group within the water injection cycle, respectively, j denotes an index of a water injection pump in a water injection station, J denotes a set of indices of water injection pumps in the water injection station, $P_{ele}$ denotes the electricity price, $\Delta T_i$ denotes a unit duration of each water injection period, $Y_{ij}$ denotes an on-off state of a j-th water injection pump in an i-th water injection period, $Q_{ij}$ denotes an outlet flow rate of the j-th water injection pump in the i-th period, $H_{ij}$ denotes an outlet head of the j-th water injection pump in the i-th water injection period, $\rho$ denotes an density of the injected water, g represents a gravitational acceleration, $\alpha$ denotes a unit conversion coefficient, $\eta_{bij}$ denotes an operating efficiency of the j-th water injection pump in the i-th water injection period, $\eta_{cij}$ denotes a transmission efficiency of the j-th water injection pump in the i-th water injection period, $\eta_{dij}$ denotes an efficiency of a motor of the j-th water injection pump in the i-th water injection period, $\eta_{pij}$ denotes a variable frequency efficiency of the motor of the j-th water injection pump in the i-th water injection period.

In S4, the water injection scheme optimization model considering multi-cycle pressure-separated water injection is a mixed-integer nonlinear programming model, and the water injection scheme optimization model is solved by performing operations including:

S401, based on the basic data of the target water injection pipeline network and the constraints, initializing parameters including a water injection duration of each water injection well, a count of operating pumps, an allocated flow rate of each water injection pump, a speed ratio of each water injection pump, an efficiency of each water injection pump, a total power of the pump unit, a total energy consumption cost of the pump unit, a cycle-level total power of the pump unit, and a cycle-level total energy consumption cost of the pump unit as an initial population of the improved butterfly algorithm using Circle chaotic mapping, the Circle chaotic mapping being represented by:

$$x_{\mu+1} = \mathrm{mod}\left(x_\mu + b^* - \left(\frac{a^*}{2\pi}\right)\sin(2\pi x_e),\ 1\right).$$

S402, randomly generating an initial position of each of butterfly individuals in a search space, and determining a fitness value and an initial fragrance intensity of the butterfly individual based on the position of the butterfly individual, wherein the fitness value is defined as the energy consumption cost of the pump unit in the target water injection pipeline network, the initial fragrance intensity is calculated by: $f=c^* \cdot R^\varphi$.

S403, setting a switching frequency P, and controlling the improved butterfly algorithm to perform global search or local exploitation, wherein during iterations, a random number rand within [0, 1] is generated and compared with the switching frequency P, if P>rand, the global search is performed, otherwise, the local exploitation is performed, the improved butterfly algorithm introduces an adaptive weight coefficient to improve an update equation for the global search and an update equation for the local exploitation, and the adaptive weight coefficient, the update equation for the global search, and the update equation for the local exploitation are represented by:

$$\sigma(t) = \sin\left(\frac{\pi t}{2 t_{max}} + \pi\right),\ x_v^{t+1} = \sigma(t)\left(x_v^t + (r^2 g' - x_v^t)\cdot f_v\right),$$

$$x_v^{t+1} = \sigma(t)\left(x_v^t + (r^2 x_{v1}^t - x_{v2}^t)\cdot f_v\right).$$

S404, updating individual optimal solutions and a global optimal solution during the iterations until a preset maximum iteration count is reached, and outputting an optimal solution obtained by the improved butterfly algorithm.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

The accompanying drawings, which are required to be used in the description of the embodiments, are briefly described below. The accompanying drawings do not represent the entirety of the embodiments.

As used herein, "system", "device", "unit" and/or "module" are used as a means of distinguishing between different levels of components, elements, parts, sections or assemblies. The words may be replaced by other expressions if other words would accomplish the same purpose.

As shown in the present disclosure and the claims, unless the context clearly suggests an exception, the words "a", "an", "one", and/or "the" do not refer specifically to the singular, but may also include the plural. Generally, the terms "including" and "comprising" only suggest the inclusion of explicitly identified steps and elements that do not constitute an exclusive list, and the method or devices may also include other steps or elements.

When describing processes performed in the embodiments of the present disclosure in terms of operations, the order of the operations are all interchangeable, some operations may be omitted, and other operations may be included in the processes, if not otherwise specified.

Figure 1:
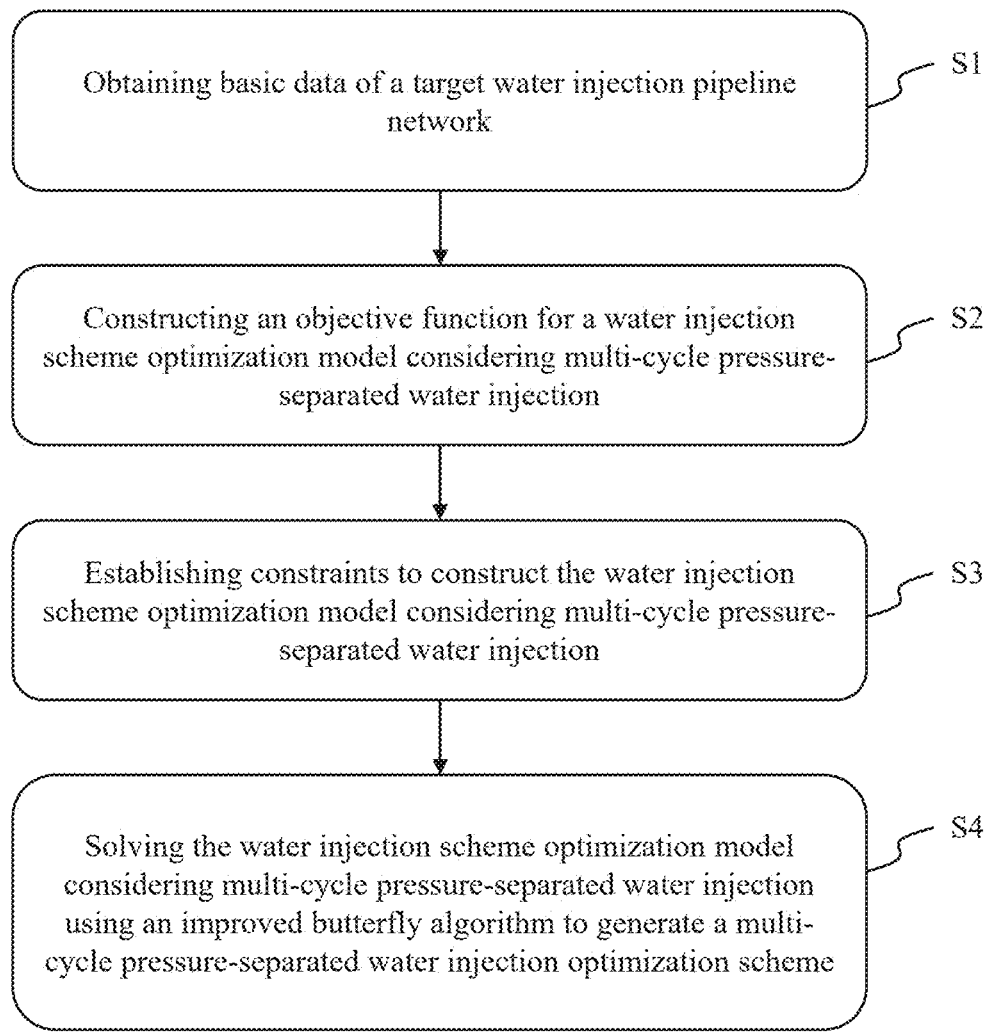
FIG. 1 is a flowchart of an exemplary process for optimizing multi-cycle pressure-separated water injection in an oilfield based on an improved butterfly algorithm according to some embodiments of the present disclosure.

FIG. 1 is a flowchart of an exemplary process for optimizing multi-cycle pressure-separated water injection in an oilfield based on an improved butterfly algorithm according to some embodiments of the present disclosure. As shown in FIG. 1, process 100 includes the following operations In some embodiments, process 100 may be executed by a processor. The processor may include one or more sub-processing devices (e.g., a single-core processing device or a multi-core, multi-chip processing device). By way of example only, the processor may include a central processing unit (CPU), an application-specific integrated circuit (ASIC), or any combination thereof.

In S1, obtain basic data of a target water injection network.

The target water injection network refers to a pipeline network system configured for oilfield water injection operations. In some embodiments, the target water injection network may consist of a water injection station (equipped with a plurality of water injection pumps), a plurality of water distribution stations (which receive water from a main pipeline and distribute the water to branch water injection wells, equipped with control valves to regulate a flow rate ratio of each branch), a plurality of water injection wells, and a plurality of water injection pipelines (the main pipeline runs from the water injection station to distribution stations, and branch pipelines run from the distribution stations to the water injection wells, equipped with throttling valves), as well as auxiliary devices (e.g., water treatment units, pipeline connection devices, various valves, flow sensors, pressure sensors, etc.).

The basic data refers to rated parameters related to the target water injection network. In some embodiments, the basic data may be pre-uploaded manually.

In some embodiments, the basic data may include pipeline network structure data, a well operation parameter, a well location parameter, a station configuration parameter, a station location parameter, water injection cycle data, a pump operation parameter, and an electricity price.

The pipeline network structure data refers to a parameter used to describe a physical composition and a connection relationship of the water injection network. For example, the pipeline network structure data may include a pipeline number, a pipeline length, a pipeline specification, a pipeline connection relationship, a pipeline friction coefficient, etc.

The well operation parameter of a water injection well refers to a demand parameter of the water injection well during operation. For example, the well operation parameter of a water injection well may include a water injection well number, a required water injection head for the water injection well, a required water injection volume for the water injection well, etc.

The required water injection head for a water injection well refers to a head corresponding to a minimum water injection pressure required to replenish a reservoir pressure, which may be determined by geological data. For example, a minimum water injection pressure of 15 MPa corresponds to a required water injection head of 1530 m.

The required water injection volume for a water injection well refers to an amount of water that the water injection well needs to inject underground within a cycle, which is manually determined based on actual requirements.

The well location parameter of a water injection well refers to geographic information describing a spatial distribution of the water injection well. For example, the well location parameter may include geographic coordinates (longitude and latitude) of the water injection well, an elevation difference relative to the water injection station, an index of the associated water distribution station, etc.

The station configuration parameter refers to equipment configuration information within the water injection station. For example, a count of pump units, a motor and transmission parameter, a pipeline length of an outlet pipeline of the water injection station, the pipeline specification, and the pipeline friction coefficient, etc.

The count of pump units refers to a total count of water injection pumps connected in parallel within the water injection station, i.e., a set of indices of water injection pumps within the station.

The motor and transmission parameter include a transmission efficiency of the water injection pump, an efficiency of a motor driving the water injection pump, and a frequency conversion efficiency. The transmission efficiency of the water injection pump refers to a mechanical transmission efficiency between the water injection pump and the motor. The efficiency of the motor driving the water injection pump refers to an efficiency of converting an electrical energy into a mechanical energy. The frequency conversion efficiency of the motor driving the water injection pump refers to an efficiency of electrical energy conversion when a frequency converter adjusts a motor speed.

The station location parameter refers to geographic location information of the water injection station. For example, the water injection station location parameter may include geographic coordinates of the water injection station, an altitude of the water injection station, and a topological distance from the water injection station to each water distribution station.

The water injection cycle data refers to time division data for multi-cycle pressure-separated water injection. For example, the water injection cycle data of a water injection cycle may include a total duration of the water injection cycle (e.g., 24 hours) and a unit duration of each period (e.g., one hour per period) within the cycle.

The pump operation parameter of a water injection pump refers to a rated working parameter of the water injection pump during operation. For example, the pump operation parameter may include a left critical flow point of the high-efficiency zone of the water injection pump, a right critical flow point of the high-efficiency zone of the water injection pump, a minimum speed ratio, a maximum speed ratio, an internal virtual resistance loss coefficient, a virtual total head, a pump efficiency coefficient, a pump performance curve, etc.

The left critical flow point of the high-efficiency zone of a water injection pump refers to a minimum flow rate value at which an efficiency of the water injection pump begins to decline (i.e., the minimum flow rate of the high-efficiency zone, such as 70% of a rated flow rate). The right critical flow point of the high-efficiency zone of the water injection pump refers to a maximum flow rate value at which the efficiency of the water injection pump begins to decline (i.e., the maximum flow rate of the high-efficiency zone, such as 120% of the rated flow).

The speed ratio of a water injection pump refers to the ratio of an actual speed of the water injection pump to a rated speed of the water injection pump. The minimum speed ratio and the maximum speed ratio refer to a minimum allowable speed ratio and a maximum allowable speed ratio during the operation of the water injection pump, respectively. For example, a minimum speed ratio of 0.4 indicates 40% of the rated speed, while a maximum speed ratio of 1.0 indicates 100% of the rated speed. The minimum allowable speed ratio and the maximum speed ratio are determined by a mechanical design of the water injection pump.

The pump efficiency coefficient is a key parameter describing a relationship between the pump efficiency, the flow rate, and the speed ratio. The internal virtual resistance loss coefficient of a water injection pump is an empirical parameter characterizing an energy loss caused by an internal channel resistance of the water injection pump. The virtual total head of a water injection pump refers to a theoretical head of the water injection pump at zero flow rate.

The pump performance curve may include a head-flow curve and an efficiency-flow curve. The head-flow curve is a descending curve, reflecting an output capacity of the water injection pump. The efficiency-flow curve is parabolic, with a highest point representing a best efficiency point of the water injection pump. The efficiency-flow curve is used to guide an operation of the water injection pump within a high-efficiency zone.

The left critical flow point of the high-efficiency zone, the right critical flow point of the high-efficiency zone, and the pump efficiency coefficient may be extracted from the efficiency-flow curve. The internal virtual resistance loss coefficient and the virtual total head may be extracted from the head-flow curve.

Taking the water injection network of an oilfield as an example, the water injection network of the oilfield includes 1 water injection station, 8 water distribution stations, 54 water injection wells, and a plurality of main pipelines and branch pipelines connecting pump units. The pipeline network structure data is shown in Table 1, exemplary well operation parameters of each water injection well are shown in Table 2, exemplary configuration parameters of the water injection station are shown in Table 3, exemplary pump operation parameters are shown in Table 4, and the electricity price is 0.75 (yuan/kWh).

TABLE 1

Pipeline Network Structure Data

| Pipeline Index | Pipeline Connection Relationship | Pipeline Length (m) | Pipeline Specification (mm) |
|---|---|---|---|
| 1#Main Pipeline | Water Injection Station—1#Distribution Station | 1000 | Φ225 × 17 |
| 2#Main Pipeline | Water Injection Station—7#Distribution Station | 1000 | Φ225 × 17 |
| 3#Main Pipeline | 7#Distribution Station—8#Distribution Station | 500 | Φ225 × 17 |
| 4#Main Pipeline | Water Injection Station—2#Distribution Station | 1000 | Φ225 × 17 |
| 5#Main Pipeline | 2#Distribution Station—5#Distribution Station | 2500 | Φ225 × 17 |
| 6#Main Pipeline | Water Injection Station—3#Distribution Station | 400 | Φ225 × 17 |
| 7#Main Pipeline | 3#Distribution Station—6#Distribution Station | 2000 | Φ225 × 17 |
| 8#Main Pipeline | 6#Distribution Station—4#Distribution Station | 1000 | Φ225 × 17 |
| 1#Branch Pipeline | 7#Distribution Station—1#Water Injection Well | 156 | Φ92 × 13 |
| 2#Branch Pipeline | 7#Distribution Station—2#Water Injection Well | 135 | Φ92 × 13 |
| 3#Branch Pipeline | 7#Distribution Station—3#Water Injection Well | 122 | Φ92 × 13 |
| 4#Branch Pipeline | 8#Distribution Station—4#Water Injection Well | 146 | Φ92 × 13 |
| 5#Branch Pipeline | 8#Distribution Station—5#Water Injection Well | 234 | Φ92 × 13 |
| 6#Branch Pipeline | 8#Distribution Station—6#Water Injection Well | 157 | Φ92 × 13 |
| 7#Branch Pipeline | 8#Distribution Station—7#Water Injection Well | 186 | Φ92 × 13 |
| 8#Branch Pipeline | 8#Distribution Station—8#Water Injection Well | 147 | Φ92 × 13 |
| 9#Branch Pipeline | 8#Distribution Station—9#Water Injection Well | 145 | Φ92 × 13 |
| 10#Branch Pipeline | 1#Distribution Station—10#Water Injection Well | 148 | Φ92 × 13 |
| 11#Branch Pipeline | 1#Distribution Station—11#Water Injection Well | 156 | Φ92 × 13 |
| 12#Branch Pipeline | 1#Distribution Station—12#Water Injection Well | 234 | Φ92 × 13 |
| 13#Branch Pipeline | 1#Distribution Station—13#Water Injection Well | 235 | Φ92 × 13 |
| 14#Branch Pipeline | 1#Distribution Station—14#Water Injection Well | 267 | Φ92 × 13 |
| 15#Branch Pipeline | 1#Distribution Station—15#Water Injection Well | 144 | Φ92 × 13 |
| 16#Branch Pipeline | 1#Distribution Station—16#Water Injection Well | 137 | Φ92 × 13 |
| 17#Branch Pipeline | 1#Distribution Station—17#Water Injection Well | 147 | Φ92 × 13 |
| 18#Branch Pipeline | 1#Distribution Station—18#Water Injection Well | 157 | Φ92 × 13 |
| 19#Branch Pipeline | 3#Distribution Station—19#Water Injection Well | 156 | Φ92 × 13 |
| 20#Branch Pipeline | 3#Distribution Station—20#Water Injection Well | 166 | Φ92 × 13 |
| 21#Branch Pipeline | 3#Distribution Station—21#Water Injection Well | 168 | Φ92 × 13 |
| 22#Branch Pipeline | 3#Distribution Station—22#Water Injection Well | 186 | Φ92 × 13 |
| 23#Branch Pipeline | 3#Distribution Station—23#Water Injection Well | 174 | Φ92 × 13 |
| 24#Branch Pipeline | 3#Distribution Station—24#Water Injection Well | 147 | Φ92 × 13 |
| 25#Branch Pipeline | 3#Distribution Station—25#Water Injection Well | 231 | Φ92 × 13 |
| 26#Branch Pipeline | 3#Distribution Station—26#Water Injection Well | 233 | Φ92 × 13 |
| 27#Branch Pipeline | 6#Distribution Station—27#Water Injection Well | 256 | Φ92 × 13 |
| 28#Branch Pipeline | 6#Distribution Station—28#Water Injection Well | 147 | Φ92 × 13 |
| 29#Branch Pipeline | 6#Distribution Station—29#Water Injection Well | 257 | Φ92 × 13 |
| 30#Branch Pipeline | 6#Distribution Station—30#Water Injection Well | 125 | Φ92 × 13 |
| 31#Branch Pipeline | 6#Distribution Station—31#Water Injection Well | 247 | Φ92 × 13 |
| 32#Branch Pipeline | 4#Distribution Station—32#Water Injection Well | 247 | Φ92 × 13 |
| 33#Branch Pipeline | 4#Distribution Station—33#Water Injection Well | 127 | Φ92 × 13 |
| 34#Branch Pipeline | 4#Distribution Station—34#Water Injection Well | 234 | Φ92 × 13 |
| 35#Branch Pipeline | 4#Distribution Station—35#Water Injection Well | 213 | Φ92 × 13 |
| 36#Branch Pipeline | 4#Distribution Station—36#Water Injection Well | 208 | Φ92 × 13 |
| 37#Branch Pipeline | 4#Distribution Station—37#Water Injection Well | 231 | Φ92 × 13 |
| 38#Branch Pipeline | 4#Distribution Station—38#Water Injection Well | 145 | Φ92 × 13 |
| 39#Branch Pipeline | 4#Distribution Station—39#Water Injection Well | 165 | Φ92 × 13 |
| 40#Branch Pipeline | 5#Distribution Station—40#Water Injection Well | 110 | Φ92 × 13 |
| 41#Branch Pipeline | 5#Distribution Station—41#Water Injection Well | 157 | Φ92 × 13 |
| 42#Branch Pipeline | 2#Distribution Station—42#Water Injection Well | 184 | Φ92 × 13 |
| 43#Branch Pipeline | 2#Distribution Station—43#Water Injection Well | 148 | Φ92 × 13 |
| 44#Branch Pipeline | 2#Distribution Station—44#Water Injection Well | 75 | Φ92 × 13 |
| 45#Branch Pipeline | 2#Distribution Station—45#Water Injection Well | 98 | Φ92 × 13 |
| 46#Branch Pipeline | 2#Distribution Station—46#Water Injection Well | 95 | Φ92 × 13 |
| 47#Branch Pipeline | 2#Distribution Station—47#Water Injection Well | 84 | Φ92 × 13 |
| 48#Branch Pipeline | 2#Distribution Station—48#Water Injection Well | 73 | Φ92 × 13 |
| 49#Branch Pipeline | 2#Distribution Station—49#Water Injection Well | 26 | Φ92 × 13 |
| 50#Branch Pipeline | 2#Distribution Station—50#Water Injection Well | 64 | Φ92 × 13 |
| 51#Branch Pipeline | 2#Distribution Station—51#Water Injection Well | 30 | Φ92 × 13 |
| 52#Branch Pipeline | 2#Distribution Station—52#Water Injection Well | 98 | Φ92 × 13 |
| 53#Branch Pipeline | 5#Distribution Station—53#Water Injection Well | 110 | Φ92 × 13 |
| 54#Branch Pipeline | 5#Distribution Station—54#Water Injection Well | 157 | Φ92 × 13 |

TABLE 2

Well operation parameters.

| Water Injection Well Index | Required Water Injection Volume (m³/h) | Requirement of Water Injection Head (Mpa) |
|---|---|---|
| 1#Water Injection Well | 13.33 | 8.5 |
| 2#Water Injection Well | 3.33 | 7.5 |
| 3#Water Injection Well | 10.67 | 9.5 |
| 4#Water Injection Well | 16.67 | 8.5 |
| 5#Water Injection Well | 7.33 | 5.8 |
| 6#Water Injection Well | 6.00 | 5.8 |
| 7#Water Injection Well | 16.00 | 10 |
| 8#Water Injection Well | 11.67 | 14 |
| 9#Water Injection Well | 15.00 | 15 |
| 10#Water Injection Well | 10.00 | 8.5 |
| 11#Water Injection Well | 16.67 | 8.0 |
| 12#Water Injection Well | 13.33 | 7.5 |
| 13#Water Injection Well | 12.67 | 11 |
| 14#Water Injection Well | 7.33 | 12 |
| 15#Water Injection Well | 10.00 | 14.5 |
| 16#Water Injection Well | 13.33 | 15.5 |
| 17#Water Injection Well | 20.00 | 14.8 |
| 18#Water Injection Well | 10.00 | 14.5 |
| 19#Water Injection Well | 13.33 | 12.5 |
| 20#Water Injection Well | 6.67 | 10.5 |
| 21#Water Injection Well | 10.00 | 11.5 |
| 22#Water Injection Well | 6.67 | 15 |
| 23#Water Injection Well | 6.00 | 15.5 |
| 24#Water Injection Well | 7.67 | 14 |
| 25#Water Injection Well | 10.33 | 13.5 |
| 26#Water Injection Well | 8.33 | 14.8 |
| 27#Water Injection Well | 5.00 | 13.8 |
| 28#Water Injection Well | 5.33 | 15.2 |
| 29#Water Injection Well | 5.00 | 15.4 |
| 30#Water Injection Well | 7.00 | 15.6 |
| 31#Water Injection Well | 18.00 | 14 |
| 32#Water Injection Well | 6.67 | 8.6 |
| 33#Water Injection Well | 10.00 | 8.7 |
| 34#Water Injection Well | 3.33 | 8.5 |
| 35#Water Injection Well | 10.00 | 8 |
| 36#Water Injection Well | 13.33 | 8 |
| 37#Water Injection Well | 11.67 | 7.5 |
| 38#Water Injection Well | 5.00 | 5.5 |
| 39#Water Injection Well | 9.33 | 10.5 |
| 40#Water Injection Well | 11.67 | 11 |
| 41#Water Injection Well | 5.00 | 12 |
| 42#Water Injection Well | 4.67 | 4.5 |
| 43#Water Injection Well | 8.67 | 8.5 |
| 44#Water Injection Well | 11.67 | 7.8 |
| 45#Water Injection Well | 10.00 | 8.5 |
| 46#Water Injection Well | 1.67 | 8.0 |
| 47#Water Injection Well | 5.00 | 8.5 |
| 48#Water Injection Well | 8.00 | 6.5 |
| 49#Water Injection Well | 5.33 | 6 |
| 50#Water | 9.67 | 12.5 |

TABLE 2-continued

Well operation parameters.

| Water Injection Well Index | Required Water Injection Volume (m³/h) | Requirement of Water Injection Head (Mpa) |
|---|---|---|
| Injection Well 51#Water Injection Well | 11.33 | 11.8 |
| 52#Water Injection Well | 7.33 | 13.5 |
| 53#Water Injection Well | 5.00 | 14.5 |
| 54#Water Injection Well | 4.67 | 14 |

TABLE 3

Station configuration parameters

| Station configuration parameter | Value |
|---|---|
| Water Supply Capacity (m³/h) | 300~700 |
| Count of Pump Units | 2 |

TABLE 4

Water Injection Station Operating Parameters

| | |
|---|---|
| Performance Curve of 1#Pump | $H = 16.9766 + 3.7546 \times 10^{-3}Q - 2.3029 \times 10^{-5}Q^2$ |
| | $\eta = 1.3233 + 0.3777Q - 6.5105 \times 10^{-5}Q^2 - 1.3098 \times 10^{-6}Q^3$ |
| Performance Curve of 2#Pump | $H = 17.9355 + 2.397 \times 10^{-4}Q - 2.6539 \times 10^{-5}Q^2$ |
| | $\eta = 1.1405 + 0.3763Q - 3.5251 \times 10^{-5}Q^2 - 1.3625 \times 10^{-6}Q^3$ |

In Table 4, H represents the head, Q represents the flow rate, and η represents the efficiency.

In S2, constructing an objective function for a water injection scheme optimization model considering multi-cycle pressure-separated water injection.

In some embodiments, multi-cycle pressure-separated water injection refers to a manner of grouping water injection wells with similar water injection pressures, equipping them with appropriate water injection pumps and corresponding water injection networks, and performing water injection at different times for injection well groups in different pressure ranges.

In some embodiments, the processor may dynamically cluster water injection wells with similar water injection pressure requirements into a same water injection well group. For example, the processor may divide water injection wells into different groups based on a low-pressure range, a medium-pressure range, and a high-pressure range, wherein the low-pressure range, the medium-pressure range, and the high-pressure range may be manually defined or automatically determined by system default. For example, the low-pressure range may be 8.0~11.0 MPa, the medium-pressure range may be 11.0~14.0 MPa, and the high-pressure range may be 14.0~18.0 MPa.

In some embodiments, the processor may configure suitable water injection pumps for different water injection well groups. For example, a centrifugal pump with $H_0$=400 m may be configured for a low-pressure range water injection well group, and a multi-stage pump with $H_0$=600 m may be configured for a high-pressure range water injection well group. $H_0$ represents the virtual total head at zero flow rate.

In some embodiments, the processor may configure corresponding water injection networks for different water injection well groups. For example, a water injection network with relatively small pipe diameters may be configured for the low-pressure water injection well group to save costs, while a water injection network with relatively large pipe diameters may be configured for the high-pressure water injection well group to ensure sufficient delivery capacity.

In some embodiments, the processor may initiate corresponding water injection pumps for different pressure ranges of water injection well groups during their respective time periods. For example, the processor may divide the water injection cycle into non-overlapping time period sets $I_1$, $I_2$, and $I_3$, wherein $(I_1 \cup I_2 \cup I_3)=I$, and I represents one water injection cycle. Merely by way of example, $I_1$=[00:00-06:00] represents a low-pressure water injection period (for the low-pressure water injection well group), $I_2$=[06:00-18:00] represents a medium-pressure water injection period (for the medium-pressure water injection well group), and $I_3$=[18:00-24:00] represents a high-pressure water injection period (for the high-pressure water injection well group).

In some embodiments of the present disclosure, the combination of pressure-separated water injection and multi-cycle time-sequence control breaks through the traditional single-pressure-level water injection mode. Through three-dimensional optimization of grouping, timing, and pressure zoning, the synergistic reduction of pump efficiency and pipeline network losses is achieved.

In some embodiments, an optimization objective of the objective function is configured to minimize an energy consumption cost of the pump unit in the water injection network. The objective function is derived based on work performed by the pump unit on injected water during each water injection period, efficiencies of the pump unit, and an electricity price, represented by Equation (1):

$$\min F = \sum_{i \in I_1, I_2, I_3} \sum_{j \in J} p_{ele} \frac{\gamma_{ij} Q_{ij} H_i \rho g \Delta T_i}{\alpha \cdot \eta_{bij} \cdot \eta_{cij} \cdot \eta_{dij} \cdot \eta_{pij}}. \quad (1)$$

In Equation (1), i denotes an index of a water injection period within a water injection cycle, $I_1$, $I_2$, and $I_3$ denote sets of water injection periods for low-pressure range, medium-pressure range, and high-pressure range water injection well groups within the water injection cycle, respectively, j denotes an index of a water injection pump in a water injection station, J denotes a set of indices of water injection pumps in the water injection station, $p_{ele}$ denotes the electricity price, $\Delta T_i$ denotes a unit duration of each water injection period (i.e., the duration of the i-th water injection time period within the water injection cycle), $\gamma_{ij}$ denotes an on-off state of a j-th water injection pump in an i-th water injection period, $\gamma_{ij} \in \{0,1\}$, wherein the value of 1 indicates that the pump is on, and value of 0 indicates that the pump is off, $Q_{ij}$ denotes an outlet flow rate of the j-th water injection pump in the i-th period, $H_{ij}$ is an outlet head of the j-th water injection pump in the i-th water injection period, ρ denotes an density of the injected water, g represents a gravitational acceleration, α denotes a unit conversion coefficient, $\eta_{bij}$ denotes an operating efficiency of the j-th water injection pump in the i-th water injection period, $\eta_{cij}$ denotes a transmission efficiency of the j-th water injection pump in the i-th water injection period, $\eta_{dij}$ denotes an efficiency of a motor of the j-th water injection pump in the i-th water injection period, $\eta_{pij}$ denotes a variable frequency efficiency of the motor of the j-th water injection pump in the i-th water injection period, F denotes the energy consumption cost.

The outlet head of a water injection pump refers to a mechanical energy obtained by a unit weight of fluid at an outlet of the water injection pump, which may be represented by a height to which the water is pumped at the outlet of the water injection pump. The outlet flow rate of a water injection pump refers to an actual output at the outlet of the water injection pump. The unit conversion coefficient is a coefficient used to convert mechanical work into an electrical energy. The operating efficiency of a water injection pump refers to a hydraulic efficiency of the water injection pump.

The energy consumption cost of the pump unit refers to an operating cost incurred by the pump unit due to electricity consumption during the water injection process. The energy consumption cost is represented by a product of a ratio of the work ($\Sigma_{i \in I_1 I_2 I_3} \Sigma_{j \in J} \gamma_{ij} Q_{ij} H_{ij} \rho g \Delta T_i$) done by the pump unit on the injected water to a total efficiency ($\Sigma_{i \in I_1 I_2 I_3} \Sigma_{j \in J} \alpha \eta_{bij} \eta_{cij} \eta_{dij} \eta_{pij}$), and the electricity price ($p_{ele}$).

The work done by the pump units on the injected water refers to a process by which the pump unit in the water injection network convert the electrical energy into the hydraulic energy (e.g., kinetic and potential energy of the injected water).

The water injection scheme optimization model considering multi-cycle pressure-separated water injection is a mixed-integer nonlinear programming model. The water injection scheme optimization model determines an optimal operating strategy for the pump unit in the water injection station through pressure zoning, multi-cycle scheduling, and equipment parameter optimization, aiming to minimize the total energy consumption cost of the water injection network. The water injection scheme optimization model may solve for decision variables (e.g., the on-off state, the outlet flow rate, the speed ratio, the outlet head, the operating efficiency, etc.) under the constraints of meeting water injection well pressure requirements, hydraulic balance of the network, and equipment operating conditions, thereby minimizing the objective function value (i.e., the energy consumption cost).

In S3, establishing constraints to construct the water injection scheme optimization model considering multi-cycle pressure-separated water injection.

In some embodiments, the constraints may be divided into station internal constraints and station-external constraints. The station-internal constraints may include a pump head constraint, a pump efficiency constraint, a speed ratio range constraint, a single-pump flow constraint, a parallel pump head constraint, a parallel flow superposition constraint, and a cycle coverage constraint. The station external constraints may include a minimum wellhead constraint, a pipeline frictional resistance constraint, a node flow rate constraint, and a total water injection balance constraint.

The pump head constraint specifies a relationship between a head and a flow rate of the water injection pump under a variable frequency speed regulation. The pump head constraint is used to describe the performance curves of the water injection pump at different speeds, ensuring that the head calculation aligns actual physical characteristics. A relationship equation for the pump head constraint may be represented by the following equation:

$$H_{ij} = k_{ij}^2 H_0 - S_j Q_{ij}^2 \qquad (2)$$

In Equation (2), $H_{ij}$ denotes an outlet head of the j-th water injection pump in the i-th water injection period, $Q_{ij}$ denotes the outlet flow rate of the j-th water injection pump in the i-th water injection period, $k_{ij}$ denotes a speed ratio of the j-th water injection pump during the i-th water injection period; $H_0$ denotes a virtual total head when the flow rate is 0; $S_j$ denotes an internal virtual resistance coefficient of the j-th water injection pump. The speed ratio of the water injection pump needs to satisfy a constraint of Equation (4), e.g., $k_{ij} \in [0.5, 1.0]$. $H_{ij}$ from the formula, $Q_{ij}$ is constrained by Equation (5)

The pump efficiency constraint specifies a relationship between an efficiency and the flow rate of the water injection pump under the variable frequency speed regulation. The pump efficiency constraint ensures that the water injection pump operates within the high-efficiency zone, avoiding inefficient conditions. A relationship equation for the pump efficiency constraint may be represented by the following equation:

$$\eta_{bij} = a + \frac{b}{k_{ij}} Q_{ij} + \frac{c}{k_{ij}^2} Q_{ij}^2 \qquad (3)$$

In Equation (3), a, b, and c denote pump efficiency coefficients. Descriptions of $\eta_{bij}$, $Q_{ij}$ may be found in Equation (1) and a description of $k_{ij}$ may be found in Equation (2)

The speed ratio range constraint specifies that the speed ratio of each water injection pump falls within a range. The speed ratio range constraint limits a speed regulation range of the water injection pump to prevent equipment damage or efficiency drops caused by overspeed or underspeed. A relationship equation for the speed ratio range constraint may be represented by the following equation:

$$k_{ij}^{lo} \leq k_{ij} \leq k_{ij}^{up} \qquad (4)$$

In Equation (4), $k_{ij}^{lo}$ denotes a minimum speed ratio of the j-th water injection pump during the i-th water injection period; $k_{ij}^{up}$ denotes a maximum speed ratio of the j-th water injection pump during the i-th water injection period; $k_{ij}$ denotes the speed ratio of the j-th water injection pump during the i-th water injection period.

The single-pump flow constraint specifies that the flow rate of each water injection pump during operation falls within a flow rate range of a high-efficiency zone. The single-pump flow constraint avoids efficiency drops or equipment damage caused by excessively low flow rates (cavitation) or excessively high flow rates (overload). A relationship equation for the single-pump flow constraint may be represented by the following equation:

$$Q_{ij}^{lo} \leq Q_{ij} \leq Q_{ij}^{up} \qquad (5)$$

In Equation (5), $Qu_{ij}^{lo}$ denotes a left critical flow point of the high-efficiency zone of the j-th water injection pump during the i-th water injection period; $Q_{ij}^{up}$ denotes a right critical flow point of the high-efficiency zone of the j-th water injection pump during the i-th water injection period;

$Q_{ij}$ denotes the outlet flow rate of the j-th water injection pump in the i-th water injection period.

The parallel pump head constraint specifies that an outlet pressure of each water injection pump is equal to an outlet pressure of the water injection station according to a principle of equal pressure in parallel pumps. In other words, outlet heads of all parallel water injection pumps are required to be equal to ensure consistent pressure in the parallel pumps, thereby avoiding reverse flow or pressure oscillations A relationship equation for the parallel pump head constraint may be represented by the following equation:

$$H_i^{out} = H_{ij} \tag{6}$$

In Equation (6), $H_i^{out}$ denotes an outlet head of the water injection station during the i-th water injection period; $H_{ij}$ denotes an outlet head of the j-th water injection pump in the i-th water injection period. The outlet head of the water injection station refers to an effective height to which the pump unit lifts the water to the outlet, reflecting an output pressure capability of the water injection pump station, and is determined by a demand of the target water injection pipeline network.

The parallel flow superposition constraint specifies that an outlet flow rate of the water injection station is equal to a sum of outlet flow rates of all water injection pumps in the water injection station according to a principle of flow superposition in parallel pumps. The parallel flow superposition constraint ensures that a total injection volume meets demands. A relationship equation for the parallel flow superposition constraint may be represented by the following equation:

$$Q_i^{out} = \Sigma_{j \in J} Q_{ij} \tag{7}$$

In Equation (7), $Q_i^{out}$ denotes the outlet flow rate of the water injection station during the i-th water injection period, which needs to satisfy Equation (12). $Q_{ij}$ represents the flow rate of a single pump. Descriptions of $Q_{ij}$ and J may be found in Equation (1).

The cycle coverage constraint specifies that a union of the sets of the water injection periods for the low-pressure range, the medium-pressure range, and the high-pressure range well groups covers the entire water injection cycle. The cycle coverage constraint ensures that all injection demands are completed in the water injection cycle to avoid omission. A relationship equation for the cycle coverage constraint may be represented by the following equation:

$$I_1 \cup I_2 \cup I_3 = I \tag{8}$$

In Equation (8), I denotes the entire water injection cycle, and descriptions of $I_1$, $I_2$ and $I_2$ may be found in Equation (1).

The minimum wellhead constraint specifies that the outlet head of the water injection station satisfies a requirement of a highest-head water injection well. The minimum wellhead constraint ensures that the injected water may overcome a formation pressure, a pipeline friction, and an elevation difference. A relationship equation for the minimum wellhead constraint may be represented by the following equation:

$$H_i^{out} \geq H_w^{standard} + H_{wf} + \Delta h_w \tag{9}$$

In Equation (9), $H_w^{standard}$ denotes a required water injection head for a w-th water injection well; $H_{wf}$ denotes a total frictional resistance loss of the w-th water injection well; $\Delta h_w$ denotes an elevation difference between the w-th water injection well and the water injection station (e.g., +50 m means that the outlet of the water injection well is 50 meters higher in elevation than the water injection station). The minimum wellhead constraint may be obtained through calculation based on the basic data. The total frictional resistance loss of the water injection well refers to a sum of energy losses of the water flowing through the pipeline due to friction during the injection process, which may be obtained through calculation by an equation. A description of $H_i^{out}$ may be found in Equation (6).

The pipeline frictional resistance constraint specifies that for a pipeline element (also referred to as a pipeline segment) with nodes m and n, if a flow direction is m→n, the pipeline element satisfies an energy equation. The pipeline frictional resistance constraint quantifies the energy loss of the water flowing through the pipeline segment to ensure reasonable head distribution. A relationship equation for the pipeline frictional resistance constraint may be represented by the following equation:

$$\Delta H_l = H_m - H_n = 10.67 \frac{Q_l^{1.852} L_l}{C^{1.852} d_l^{4.87}} \tag{10}$$

In Equation (10), $\Delta H_l$ denotes an absolute value of a frictional resistance loss of a pipeline segment l; $H_m$ denotes a head at the node m; $H_{mn}$ denotes a head at the node n; $Q_l$ denotes an absolute value of a flow rate in the pipeline segment l, which may be determined by a node flow balance, such as obtained by calculation via Equation (11); $d_l$ denotes a diameter of the pipeline segment l; $L_l$ denotes a length of the pipeline segment l; C denotes a calculation coefficient (i.e., a pipe friction coefficient). For a plastic pipeline, C is taken as 150; for a new cast iron pipeline, C is taken as 130; and for a concrete pipeline, C is taken as 120.

The node flow rate constraint specifies that all nodes in the target water injection pipeline network satisfy the node flow balance. In other words, for each of the nodes in the target water injection pipeline network, a flow rate into the node is equal to a flow rate out of the node at any time. The node flow rate constraint reflects that the target water injection pipeline network satisfies a law of mass conservation and prevents flow distribution conflicts. A relationship equation for the node flow rate constraint may be represented by the following equation:

$$q_m + \Sigma_{l \in L} \beta_{ml} Q_{ml} = 0 \tag{11}$$

In Equation (11), $q_m$ denotes a flow rate at the node m; $Q_{ml}$ denotes a flow rate in the pipeline segment l connected to the node m; $\beta_{ml}$ denotes a flow direction coefficient of the pipeline segment l connected to the node m; L denotes a set of pipeline segments connected to the node m. The flow direction coefficient describes a flow direction relationship between a node and a pipeline segment connected to the node in the target water injection pipeline network, which may be determined by a topology of the target water injection pipeline network, e.g., +1 indicates flowing into the node and −1 indicates flowing out from the node.

The total water injection balance constraint specifies that the entire water injection pipeline network satisfies a system supply-demand flow rate balance. In other words, a sum of outlet flow rates of the water injection station during each water injection period in the entire water injection cycle is equal a sum of daily demand volumes and daily leakage volumes of all water injection wells in the target water injection pipeline network. The total water injection balance constraint ensures a supply-demand balance of a water injection system (i.e., the target water injection pipeline network) and avoids over-injection or under-injection. A relationship equation for the total water injection balance constraint may be represented by the following equation:

$$\Sigma_{i \in I} Q_i^{out} = \Sigma_{i \in I} \Sigma_{w \in W} Q_{wi} + \Delta Q \qquad (12).$$

In Equation (12), Q_wi denotes a required water injection volume for the w-th water injection well during the i-th water injection period; W denotes a set of all the water injection wells in the target water injection pipeline network; ΔQ denotes a total flow loss within the water injection cycle (i.e., the daily leakage volumes of all water injection wells during the water injection cycle), which may be estimated manually or by system default based on empirical values; I denotes the entire water injection cycle (i.e., the sets of water injection periods during the water injection cycle). A description of I may be found in Equation (8). A description of $Q_i^{out}$ may be found in Equation (7).

More descriptions of the parameters represented by symbols in the above relational equations may be found in S1 and related descriptions thereof.

The descriptions of the symbols in Equations (1) to (12) are summarized in Tables 5 and 6.

TABLE 5

Indices and Sets of the Water Injection Scheme Optimization Model Considering Multi-Cycle Pressure-Separated Water Injection

| | |
|---|---|
| j∈J | Set of indices of water injection pumps in the water injection station |
| l∈L | Set of pipeline elements (i.e., pipeline segments) |
| m/n | Two nodes of any pipeline element with flow direction m→n |
| w∈W | Set of indices of water injection well |
| i∈I$_1$/I$_2$/I$_3$ | Sets of water injection time periods for low-pressure range, medium-pressure range, and high-pressure range water injection well groups within the water injection cycle |

TABLE 6

Known Parameters of the Water Injection Scheme Optimization Model Considering Multi-Cycle Pressure-Separated Water Injection

| | |
|---|---|
| d$_l$ | Diameter of the pipeline segment l, (m) |
| C | Calculation coefficient, 150 for plastic pipeline, 130 for new cast iron pipeline, 120 for concrete pipeline |
| F | Energy consumption cost, (yuan) |
| H$_{ij}$ | Outlet head of the j-th water injection pump in the i-th water injection period, (m) |
| H$_m$ | Head at the node m, (m) |
| H$_n$ | Head at the node n, (m) |
| H$_o$ | Virtual total head when the flow rate is 0, (m) |
| H$_i^{out}$ | Outlet head of the water injection station during the i-th water injection period, (m) |
| H$_w^{Standard}$ | Required water injection head for the w-th water injection well, (m) |
| H$_{wf}$ | Total frictional resistance loss of the w-th water injection well, (m) |
| I | Entire water injection cycle |
| g | Gravitational acceleration, (m/s$^2$) |
| k$_{ij}$ | Speed ratio of the j-th water injection pump during the i-th water injection period |
| k$_{ij}^{lo}$ | Minimum speed ratio of the j-th water injection pump during the i-th water injection period |
| k$_{ij}^{up}$ | Maximum speed ratio of the j-th water injection pump during the i-th water injection period |
| L$_l$ | Length of the pipeline segment l, (m) |
| p$_{Ele}$ | Electricity price, (yuan/kwh) |
| q$_m$ | Flow rate at the node m, (m$^3$/h) |
| Q$_{ij}$ | Outlet flow rate of the j-th water injection pump in the i-th water injection period, (m$^3$/h) |
| Q$_l$ | Absolute value of the flow rate in the pipeline segment l, (m$^3$/s) |
| Q$_{wi}$ | Required water injection volume for the w-th water injection well during the i-th water injection period, (m$^3$/h) |
| Q$_{ij}^{lo}$ | Left critical flow point of the high-efficiency zone of the j-th water injection pump during the i-th water injection period, (m$^3$/h) |
| Q$_{ij}^{up}$ | Right critical flow point of the high-efficiency zone of the j-th water injection pump during the i-th water injection period, (m$^3$/h) |
| Q$_i^{out}$ | Outlet flow rate of the water injection station during the i-th water injection period, (m$^3$/h) |
| S$_j$ | Internal virtual resistance coefficient of the j-th water injection pump |
| α | Unit conversion coefficient, (3.6 × 10$^6$) |
| γ$_{ij}$ | On-off state of the j-th water injection pump in the i-th water injection period |
| ρ | Density of the injected water, (kg/m$^3$) |
| η$_{bij}$ | Operating efficiency of the j-th water injection pump in the i-th water injection period, (%) |
| η$_{cij}$ | Transmission efficiency of the j-th water injection pump in i njection period, (%) |
| η$_{dij}$ | Efficiency of the motor of the j-th water injection pump in the i-th water injection period, (%) |
| η$_{pij}$ | Ariable frequency efficiency of the motor of the j-th water injection pump in the i-th water injection period, (%) |
| β$_{ml}$ | Flow direction coefficient of the pipeline segment l connected to the node m |
| Δh$_w$ | Elevation difference between the w-th water injection well and the water injection station, (m) |
| ΔH$_l$ | Absolute value of the frictional resistance loss of the pipeline segment l, (m) |
| ΔQ | Total flow loss within the water injection cycle, (m$^3$/d) |
| ΔT$_i$ | Unit duration of each water injection period, (h) |

In S4, solving the water injection scheme optimization model considering multi-cycle pressure-separated water injection using the improved butterfly algorithm to generate a multi-cycle pressure-separated water injection optimization scheme.

In some embodiments, the water injection scheme optimization model considering multi-cycle pressure-separated water injection is a mixed-integer nonlinear programming model, and the water injection scheme optimization model is solved using the improved butterfly algorithm. The improved butterfly algorithm refers to an algorithm that enhances a global search capability and a convergence speed by introducing adaptive weight coefficients and chaotic mapping into a search mechanism and update equations of a traditional butterfly algorithm. By simulating a foraging behavior and an information transfer mechanism of butterfly populations, and incorporating the actual constraints of the target water injection pipeline network, the improved butterfly algorithm generates an optimal water injection scheme for the water injection system that accounts for multi-cycle pressure-separated water injection.

In some embodiments, an input of the water injection scheme optimization model considering multi-cycle pressure-separated water injection is the basic data of the target water injection pipeline network, and an output of the water injection scheme optimization model is a multi-cycle pressure-separated water injection optimization scheme.

More descriptions of the basic data may be found in the related description of S1.

In some embodiments, the multi-cycle pressure-separated water injection optimization scheme includes a water injection duration of each water injection well (i.e., $I_1$, $I_2$, $I_3$), a count of operating pumps (determined based on the on-off state $\gamma_{ij}$ of the j-th water injection pump in the i-th water injection period), an allocated flow rate (the outlet flow rate $Q_{ij}$ of the j-th water injection pump in the i-th period) of each water injection pump, the speed ratio (the speed ratio $k_{ij}$ of the j-th water injection pump during the i-th water injection period) of each water injection pump, the efficiency $$\left(\frac{Q_{ij}H_{ij}\rho q}{\eta_{bij}\cdot\eta_{cij}\cdot\eta_{dij}\cdot\eta_{pij}}\right)$$

of each water injection pump, a total power $$\left(\sum_{j\in J}\frac{Q_{ij}H_{ij}\rho q}{\eta_{bij}\cdot\eta_{cij}\cdot\eta_{dij}\cdot\eta_{pij}}\right)$$

of the pump unit, a total energy consumption cost $$\left(\sum_{j\in J}P_{ele}\frac{\gamma_{ij}Q_{ij}H_{ij}\rho q}{\eta_{bij}\cdot\eta_{cij}\cdot\eta_{dij}\cdot\eta_{pij}}\right)$$

of the pump unit, a cycle-level total power $$\left(\sum_{i\in I_1,I_2,J_3}\sum_{j\in J}\frac{\gamma_{ij}Q_{ij}H_{ij}\rho q\Delta T_i}{\eta_{bij}\cdot\eta_{cij}\cdot\eta_{dij}\cdot\eta_{pij}}\right)$$

of the pump unit, and a cycle-level total energy consumption cost (F) of the pump unit.

Figure 2:
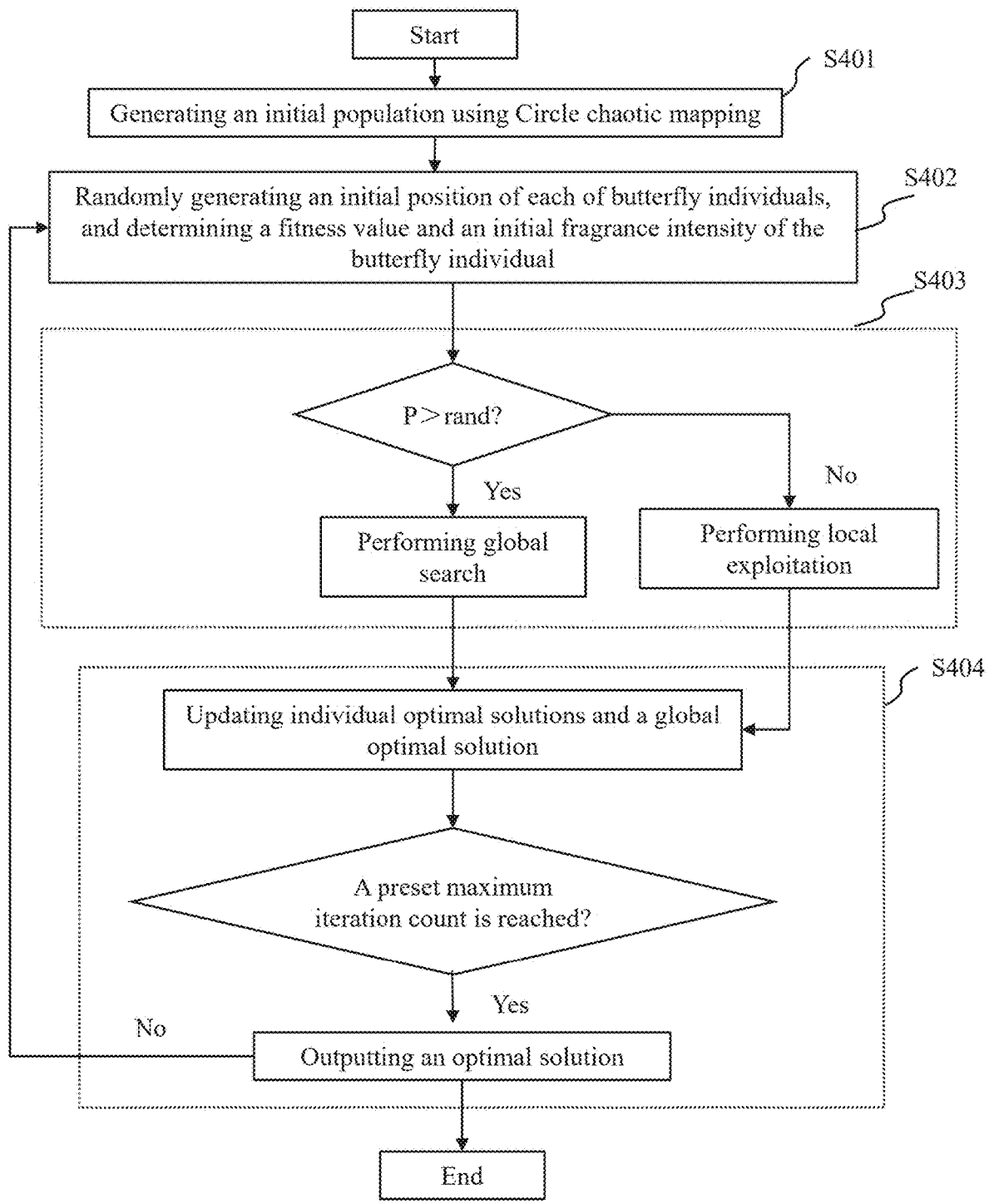
FIG. 2 is a flowchart of an exemplary process for an improved butterfly algorithm according to some embodiments of the present disclosure.

FIG. 2 is a flowchart of an exemplary process for an improved butterfly algorithm according to some embodiments of the present disclosure. In some embodiments, S4 includes S401-S404, as shown in FIG. 2.

S401, based on the basic data of the target water injection pipeline network and the constraint conditions, initializing parameters including a water injection duration of each water injection well, a count of operating pumps, a allocated flow rate of each water injection pump, a speed ratio of each water injection pump, an efficiency of each water injection pump, a total power of the pump unit, a total energy consumption cost of the pump unit, a cycle-level total power of the pump unit, and a cycle-level total energy consumption cost of the pump unit as an initial population of the improved butterfly algorithm using Circle chaotic mapping. The Circle chaotic mapping may be represented by:

$$x_{\mu+1} = \text{mod}\left(x_\mu + b^* - \left(\frac{a^*}{2\pi}\right)\sin(2\pi x_e), 1\right). \tag{13}$$

The Circle chaotic mapping is a manner of generating a pseudo-random sequence by iteration, where each chaotic value $x_\mu$ in a chaotic sequence is computed from a previous value. A length of the chaotic sequence (i.e., a count of chaotic values in the chaotic sequence) is equal to a product of a population size (i.e., a count of butterfly individuals) and a dimension of a butterfly individual. The butterfly individuals in the improved butterfly algorithm are multi-cycle pressure-separated water injection optimization schemes and the dimension of the butterfly individual is a count of parameters included in the multi-cycle pressure-separated water injection optimization scheme.

In Equation (13), u indicates a current chaotic iteration count, starting from 0; $x_\mu$ denotes a chaotic value generated by a μ-th chaotic iteration, i.e., a μ-th value of the chaotic sequence, and an initial value of $x_0$ may be randomly generated, $x_0 \in [0,1]$; $X_{\mu+1}$ denotes a chaotic value generated by a (μ+1)-th chaotic iteration, i.e., a (μ+1)-th value of the chaotic sequence; a* and b* are control parameters of the Circle chaotic mapping, which are adjusted manually according to experiments; e denotes an index of a random position in the chaotic sequence, and e=i or randomly selected; mod denotes modulo calculation, and a result of the modulo calculation is in an interval [0,1).

Generating the initial population using the Circle chaotic mapping can improve a population diversity and prevent the algorithm from falling into a local optimum, and the Circle chaotic mapping can cover a search space more evenly than other random initialization techniques.

The water injection duration of a water injection well refers to a duration of an injection operation for the water injection well during a single water injection cycle. The count of operating pumps refers to a count of water injection pumps actually in operation in the water injection station. The allocated flow rate of a water injection pump refers to an injection flow rate that the water injection pump is assigned during operating. The total power of the pump unit refers to a sum of the power of all the operating pumps in the water injection station.

S402, randomly generating an initial position of each of the butterfly individuals in a search space, and determining a fitness value and an initial fragrance intensity of the butterfly individual based on the position of the butterfly individual. The fitness value is defined as the energy consumption cost of the pump unit in the target water injection pipeline network (i.e., the value of the objective function F), the initial fragrance intensity may be calculated by:

$$f = c^* \cdot R^\varphi \tag{14}$$

In Equation (14), f denotes the initial fragrance intensity of the butterfly individual; R denotes the fitness value of the butterfly individual (i.e., the energy consumption cost F); φ denotes a nonlinear adjustment factor, $\varphi \in [0.5,1]$, which is used to control a sensitivity level of the fragrance to a change of fitness; and c* denotes a scaling coefficient for the fragrance intensity, $c^* \in [0,1]$, c* may be adjusted manually based on experiments.

The fragrance intensity of a butterfly individual reflects an individual attractiveness of the butterfly individual. The better the fitness of the butterfly individual is, the stronger the fragrance intensity of the butterfly individual is. The fragrance intensity is used to guide the algorithm to search in a direction of a more optimal solution.

S403, setting a switching frequency P, and controlling the improved butterfly algorithm to perform global search or local exploitation. During iterations, a random number rand within [0, 1] is generated and compared with the switching frequency P. If P>rand, the global search is performed, otherwise, the local exploitation is performed. The improved butterfly algorithm introduces an adaptive weight coefficient to improve an update equation for the global search and an update equation for the local exploitation. The adaptive weight coefficient, the update equation for the global search, and the update equation for the local exploitation are represented by:

$$\sigma(t) = \sin\left(\frac{\pi t}{2t_{max}} + \pi\right) \tag{15}$$

$$x_v^{t+1} = \sigma(t)\left(x_v^t + \left(r^2g^* - x_v^t\right)\cdot f_v\right) \tag{16}$$

-continued
$$x_v^{t+1} = \sigma(t)(x_v^t + (r^2 x_{v1}^t - x_{v2}^t) \cdot f_v) \quad (17)$$

Equation (15) is an equation for the adaptive weight coefficient. In Equation (15), t denotes a current iteration count; $t_{max}$ denotes a preset maximum iteration count; $\sigma(t)$ denotes an adaptive weight coefficient for a t-th iteration, and $\sigma(t) \in [-1,1]$.

Equation (16) is the update equation for the global search. In Equation (16), $x_v^t$ represents a current position of a v-th butterfly individual in the t-th iteration, $x_v^{t+1}$ represents a new position of the v-th butterfly individual in the (t+1)-th iteration, g' represents a position of a current global optimal solution (i.e., a position of a butterfly individual with a smallest fitness value), r represents a random number used to control a search step size, $r \in [0,1]$, and $f_v$ represents a fragrance intensity of the v-th butterfly individual.

Equation (17) is the update equation for the local exploitation. In Equation (17), $x_{v1}^t$ denotes a current position of a randomly selected v1-th butterfly in the t-th iteration, v1≠v. $x_{v2}^t$ denotes a current position of a randomly selected v2-th butterfly in the t-th iteration, v2≠v,v1.

The switching frequency P refers to a threshold probability used to control the improved butterfly algorithm to perform the global search or the local exploitation. In some embodiments, the switching frequency P may be set manually based on experience or historical data, or set by system default. For example, P=0.8 indicates an 80% probability of performing the global search and a 20% probability of performing the local exploitation.

S404, updating individual optimal solutions and a global optimal solution during the iterations until the preset maximum iteration count is reached, and outputting an optimal solution obtained by the improved butterfly algorithm.

In some embodiments, the processor may calculate an objective function value (i.e., the energy consumption cost of the pump unit) corresponding to each butterfly individual. Each butterfly individual records a corresponding optimal position (i.e., an individual optimal solution), and a solution with a best fitness value among the individual optimal solutions is selected as the global optimal solution. The processor determines whether or not the preset maximum iteration has been reached. If the preset maximum iteration count has been reached, the processor stops the iterations and outputs the global optimal solution; otherwise, the processor returns S403 to continue iterating.

In some embodiments, during the iterations, the processor may dynamically adjust the switching frequency P based on the current iteration count, a changing characteristic of the objective function value, and a diversity of solutions.

The changing characteristic of the objective function value includes a change of the energy consumption cost and a change of a parameter in the corresponding optimized water injection scheme. The changing characteristic of the objective function value may reflect a difference between solutions obtained in the current iteration and solutions obtained in a previous iteration or preceding N iterations.

The improved butterfly algorithm is a solver for the water injection scheme optimization model considering multi-cycle pressure-separated water injection, and is used to find an optimal solution of the objective function under constraints. The optimal solution output by the improved butterfly algorithm is the solution of the water injection scheme optimization model, which corresponds to the final optimized water injection scheme.

The improved butterfly algorithm generates a plurality of solutions in a single iteration, with each butterfly individual corresponding to one solution in the iteration. In some embodiments, the greater the count of distinct solutions is, the higher the diversity of solutions is. The diversity of solutions may be represented by a population diversity index.

In some embodiments, during the iterations, the processor may determine the count of the current iteration, the changing characteristic of the objective function value, and the diversity of solutions for each iteration. The switching frequency P may be determined by looking up a preset table constructed manually based on empirical knowledge or historical data.

In some embodiments, the processor may determine a first threshold, a second threshold, a third threshold, and a fourth threshold based on a water injection well distribution characteristic, and dynamically adjust the switching frequency P based on the first threshold, the second threshold, the third threshold, the fourth threshold, the changing characteristic of the objective function value, and the diversity of solutions.

The water injection well distribution characteristic refers to a spatial layout and arrangement of water injection wells in an oilfield. The water injection well distribution characteristic reflects a location relationship between an oil well and the water injection wells.

The first threshold, the second threshold, the third threshold, and the fourth threshold may be determined by the processor or manually based on the water injection well distribution characteristic by looking up a table. The first threshold and the second threshold are relatively small, and the third threshold and the fourth threshold are relatively large. For example, the first threshold, the second threshold, the third threshold, and the fourth threshold are 0.05, 0.2, 0.4, and 0.5, respectively.

In some embodiments, if a rate of change of the objective function value in each of consecutive M iterations is less than the first threshold or the diversity of solutions is less than the second threshold in each of consecutive M iterations, the processor may increase the switching frequency P. If a rate of change of the objective function value corresponding to a Y-th iteration is greater than the third threshold and the diversity of solutions is greater than the fourth threshold, the processor may decrease the switching frequency P. An adjustment magnitude of the switching frequency P correlates with at least one of the value of M and the value of Y. For example, the larger at least one of the value of M and the value of Y is, the greater the adjustment magnitude of the switching frequency P is.

In some embodiments of the present disclosure, the switching frequency P may be increased by setting the above four thresholds when the improved butterfly algorithm is likely to fall into a local optimum or when the population becomes overly concentrated, thereby enhancing a global exploration capability and prompting the improved butterfly algorithm to jump out of local optimal regions. Conversely, when a new potential region is discovered and solutions are widely distributed, the switching frequency P may be decreased to focus on local fine-grained search, thereby accelerating convergence to high-quality solutions.

In some embodiments, the processor may dynamically adjust the switching frequency based on the current iteration count, a historical objective function value, a diversity of historical solutions, a population state characteristic, water injection pipeline network data, and well production data.

The historical objective function value refers to an objective function value determined in previous iteration.

The diversity of historical solutions refers to a plurality of solutions generated by the improved butterfly algorithm during historical iterations.

In some embodiments, the population state characteristic may include a location distribution of the butterfly individuals and a movement trend of the butterfly individuals. The location distribution of the butterfly individuals refers to a distribution of the butterfly individuals in a solution space, e.g., a density of the solutions, a coverage area of the solutions, or the like. The movement trend of the population individuals refers to a movement direction and a movement distance of the butterfly individuals in most recent N iterations.

In some embodiments, the water injection pipeline network data may include a pipe friction coefficient, a node flow balance, and an efficiency of the pump unit. The node flow balance refers to a flow distribution of each node in the target water injection pipeline network. The efficiency of the pump unit may include an operating efficiency and a transmission efficiency of the water injection pump, an efficiency and a variable frequency efficiency of a motor of the water injection pump, or the like.

More descriptions of the above parameters may be found in the description of FIG. 1.

The well production data may include a well fluid production, a water content, and a pressure balance. The well fluid production refers to a daily or hourly production of each oil well, the water content refers to a proportion of water in an output fluid of the oil well, and the pressure balance refers to a pressure difference between the water injection well and the oil well.

In some embodiments, the processor may determine the switching frequency P using a frequency adjustment model based on the current iteration count, the historical objective function value, the diversity of the historical solutions, the population state characteristic, the water injection pipeline network data, and the well production data.

In some embodiments, the frequency adjustment model may be a machine learning model. For example, the frequency adjustment model may be a Recurrent Neural Network (RNN), etc. The population state characteristic may assist the frequency adjustment model in determining states of the global search and the local exploitation of the population, thereby adjusting the switching frequency P.

In some embodiments, inputs of the frequency adjustment model may include the current iteration count, the historical objective function value, the diversity of historical solutions, the population state characteristic, the water injection pipeline network data, and the well production data, and outputs of the frequency adjustment model may include one or more switching frequencies P.

In some embodiments, the frequency adjustment model may be trained based on a large number of first training samples with first labels. The processor may input a plurality of first training samples with the first labels into an initial frequency adjustment model, construct a first loss function using the first labels and an output of the initial frequency adjustment model, and train the initial frequency adjustment model based on the first loss function to obtain a trained frequency adjustment model. The model training is completed when a preset condition is satisfied, and the trained frequency adjustment model is obtained. The preset condition may be that the first loss function converges, a first count of iterations reaches a preset count threshold, or the like.

The first training samples and the first labels may be obtained based on at least one of historical data and experimental data. A group of first training samples may include a current iteration count corresponding to a first historical moment in the historical data, and a historical objective function value, a diversity of historical solutions, a historical population state characteristic, historical water injection pipeline network data, and historical well production data at a second historical moment. The first historical moment is after the second historical moment. The processor may conduct a plurality of experiments on the group of first training samples based on a plurality of switching frequencies P, wherein one experiment includes a plurality of iterations, and one experiment corresponds to one set of switching frequencies P values), and select a set of switching frequencies P values that maximize the change of the subsequent objective function value and finds an optimal solution as the first label corresponding to the group of first training samples.

In some embodiments of the present disclosure, by dynamically adjusting the switch frequency P using multi-dimensional data, a dynamic balance between the global search and the local exploitation is achieved, thereby ensuring that convergence speed and solution quality are optimized simultaneously, while deeply integrating characteristics of the target water injection pipeline network and an oilfield production system.

In some embodiments, the processor may generate a water injection control instruction based on a water injection parameter in the multi-cycle pressure-separated water injection optimization scheme, and send the water injection control instruction to an automated controller to instruct the automated controller to control a water injection device to perform water injection based on the water injection parameter. The processor may determine an oil production operation parameter of an oil production device based on the water injection parameter, generate an oil production control instruction based on the oil production operation parameter, and send the oil production control instruction to the automated controller to instruct the automated controller to control the oil production device to perform oil production based on the oil production operation parameter.

In some embodiments, the water injection parameter may include the water injection duration of each water injection well, the count of operating pumps, the allocated flow rate of each water injection pump, the speed ratio of each water injection pump, the efficiency of each water injection pump, the total power of the pump unit in the target water injection pipeline network. More descriptions of the above parameters may be found in the description of the multi-cycle pressure-separated water injection optimization scheme above.

The water injection control instruction refers to an instruction for controlling an operation of the water injection device.

The automated controller refers to a device for automatically controlling and managing equipment such as a Programmable Logic Controller (PLC).

In some embodiments, the processor may directly generate the water injection control instruction based on the water injection parameter in the multi-cycle pressure-separated water injection optimization scheme and send the water injection control instruction to the automated controller. The automated controller controls the operation of the water injection device based on the water injection parameter to achieve precise water injection. The water injection device includes the water injection pump, the motor of the water injection pump, an auxiliary device, or the like.

The oil production device may include an oil pump, a separator, an oil pipeline, or the like. One oil well corresponds to one oil production device, and one oil well is surrounded by a plurality of water injection wells.

The oil production operation parameter refers to a parameter related to the operation of the oil production device. For example, the oil production operation parameter includes a stroke (a vertical movement distance of a pumping rod) of the oil pump, a stroke frequency (a count of vertical movements per minute of the pumping rod), a power (a required operating power) of the oil pump, a count of activated separators, and an oil transportation speed of an oil transportation pipeline.

In some embodiments, the processor may determine an estimated liquid production volume at a future time point based on a water injection volume at the future time point, and determine the oil production operation parameter based on the estimated liquid production volume.

The estimated liquid production volume refers to a predicted total liquid output from the oil field. The processor may determine the estimated liquid production volume, denoted as D, using the following equation:

$$D = d_1 \times x_1 + d_2 \times x_2 \quad (19)$$

In Equation (19), $x_1$ represents the water injection volume at the future time point, D represents the estimated liquid production volume at the future time point, $x_2$ represents a pipeline diameter, $d_1$ and $d_2$ are coefficients. In some embodiments, $d_1$ and $d_2$ may be obtained through curve fitting using historical water injection volumes, historical pipeline diameters, and historical liquid production volumes at a plurality of historical time points.

In some embodiments, the oil production operation parameter may be related to the estimated liquid production volume. A larger estimated liquid production volume corresponds to a greater stroke length, a higher stroke frequency, an increased power for the oil pump, more activated separators, and a faster oil transportation speed of the oil transportation pipeline.

In some embodiments, the processor may further acquire an oil production characteristic through a feature acquisition device, determine the estimated liquid production volume via a liquid production estimation model based on the oil production characteristic, the water injection parameter, and water injection well distribution characteristic, and determine the oil production operation parameter based on the estimated liquid production volume. The liquid production estimation model is a machine learning model.

The feature acquisition device may include a temperature sensor, a pressure sensor, etc. In some embodiments, feature acquisition device may be deployed at various locations such as inside an oil reservoir, at a wellhead, at a bottom of the oil well, at a water injection wellhead, or the like.

In some embodiments, the oil production characteristic may include an oil temperature, a wellhead pressure, a bottomhole pressure, an internal oil pressure, a water injection temperature, or the like.

Oil well dimensional data includes an oil well depth, an oil well diameter, or the like.

In some embodiments, the processor may acquire the oil production characteristic collected and uploaded by the feature acquisition device.

In some embodiments, the liquid production estimation model may be a machine learning model. For example, the liquid production estimation model may be a Recurrent Neural Network (RNN), etc.

In some embodiments, an input of the liquid production estimation model may include the oil production characteristic, the water injection parameter, the water injection well distribution characteristic, the oil well dimensional data, an oil property characteristic, and a geological characteristic. An output of the liquid production estimation model may be the estimated liquid production volume.

The oil property characteristic may include a density, a viscosity, a Reynolds number, temperature dependency, and pressure sensitivity of the oil, which may be obtained through sampling and analysis of the oil. The Reynolds number refers to a dimensionless number used to describe a flow state of a fluid (e.g., the oil) and determine whether the flow state is laminar or turbulent. The temperature dependency refers to a variation pattern of oil viscosity with temperature. The pressure sensitivity refers to a variation pattern of oil volume with pressure.

The geological characteristic may include permeability, porosity, and a reservoir thickness of a formation where the oil well is located, obtainable through geological exploration analysis. The permeability refers to an ability of a reservoir rock to allow a fluid (e.g., the oil) to pass through. The porosity refers to a proportion of a pore space in a total volume of the reservoir rock. The reservoir thickness refers to an effective thickness of an oil-bearing formation.

In some embodiments, the liquid production estimation model may be trained based on a large number of second training samples with second labels. A training process of the liquid production estimation model is similar to the training process of the frequency adjustment model, which may be found in related descriptions above.

The second training samples may be obtained from historical data. A group of second training samples may include a historical oil production characteristic, a historical water injection parameter, a historical water injection well distribution characteristic, historical oil well dimensional data, a historical oil property characteristic, and a historical geological characteristic. The second label of the group of second training samples may be an actual liquid production volume after water injection according to the historical water injection parameter.

More descriptions regarding the determination of the oil production operation parameter based on the estimated liquid production volume may be found in the aforementioned related descriptions.

In some embodiments, the liquid production estimation model may be further trained based on a training sample set. The training sample set includes a plurality of groups of training samples and training labels corresponding to the groups of training samples. Each of the plurality of groups of training samples include a sample production characteristic, a sample water injection parameter, a sample distribution characteristic, sample dimensional data, a sample property characteristic, and a sample geological characteristic corresponding to a sample oil well. A proportion of the training samples corresponding to each sample oil well in the training sample set is not less than a predetermined threshold corresponding to the each sample oil well. The predetermined threshold corresponding to a sample oil well is determined based on an oil complexity level and a geological complexity level of the sample oil well.

The sample production characteristic refers to a sample oil production characteristic. The sample distribution characteristic refers to a sample water injection well distribution characteristic. The sample dimensional data refers to sample oil well dimensional data. The sample property characteristic refers to a sample oil property characteristic.

The oil complexity level refers to a complexity degree of a composition of the oil. The more types of components in the oil is, the higher the oil complexity is. In some embodiments, the oil complexity level may be obtained based on conventional calculation formulas.

The geological complexity level refers to a complexity degree of a geological formation where the oil well is located. In some embodiments, the geological complexity may be obtained through weighted summation of the permeability, the porosity, and the reservoir thickness in the geological characteristic, and weights for the weighted summation may be preset manually.

In some embodiments, the processor may determine the predetermined threshold corresponding to a sample oil well based on the oil complexity level and the geological complexity level of the sample oil well. For example, the higher the oil complexity level and the geological complexity level are, the larger the predetermined threshold may be.

In some embodiments of the present disclosure, by introducing the oil complexity level and the geological complexity level and combining with the configuration of the predetermined threshold, a generalization capability of the liquid production estimation model in different complexity scenarios can be effectively improved, thereby enhancing the robustness and prediction accuracy of the liquid production estimation model.

In some embodiments of the present disclosure, through a combination of a machine learning model (e.g., the liquid production estimation model) with the water injection well distribution characteristic and the oil production characteristic, a more accurate estimation of the liquid production volume can be achieved, thereby optimizing the oil production operation parameter. This manner not only improves oil production efficiency but also enhances stability and economic benefits of oil well production.

The oil production control instruction refers to an operational instruction for guiding an operation of the oil production device.

In some embodiments, the processor may instruct the automated controller through the oil production control instruction to control the oil production device to perform oil production based on the oil production operation parameter.

In some embodiments of the present disclosure, by directly converting water injection parameter in the optimized water injection scheme into the water injection control instruction and sending the water injection control instruction to the automated controller, automation and precise control of a water injection process can be achieved. Simultaneously, by generating the oil production operation parameter and the oil production control instruction based on the water injection parameter, coordinated optimization of the water injection and the oil production process can be achieved, thereby improving oil production efficiency and overall production benefits of the oil well, reducing manual intervention costs, and enhancing an intelligent level of oilfield development.

In some embodiments, the processor may further obtain actual liquid production data through a monitoring device after the automated controller controls the water injection device to perform water injection based on the water injection parameter, and update the water injection parameter based on the actual liquid production data. The processor may further generate a new water injection control instruction based on an updated water injection parameter and send the new water injection control instruction to the automated controller to instruct the automated controller to control the water injection device to perform water injection based on the updated water injection parameters.

The actual liquid production data may include an actual liquid production volume and a produced liquid water content.

In some embodiments, the processor may obtain the actual fluid production data directly through the monitoring device (e.g., a flow meter, a separator, etc.).

In some embodiments, the processor may adjust the water injection parameter based on the liquid production volume and the produced liquid water content of the oil well.

In some embodiments, the processor may construct a fluid production feature vector based on the actual production fluid data, a current water injection parameter, the oil property characteristic, and the geological characteristic. The processor may then retrieve a reference fluid production feature vector with a highest similarity from a vector database, and determine a reference water injection parameter corresponding to the reference fluid production feature vector as the updated water injection parameter.

In some embodiments, the vector database may be constructed by the processor or technical personnel based on at least one of historical data and experimental data. The vector database includes a plurality of reference fluid production feature vectors and reference water injection parameters corresponding to the reference fluid production feature vectors. Each of the reference fluid production feature vectors may be directly constructed from the historical data. By continuously adjusting a plurality of sets of water injection parameters, a set of water injection parameters that restore the liquid production volume and the produced liquid water content of the oil well to an expected range is determined and recorded as the reference water injection parameters corresponding to the reference fluid production feature vector.

In some embodiments, the processor may store a plurality of reference fluid production feature vectors and their corresponding updated reference water injection parameters in the vector database (e.g., Milvus, Faiss, or other vector databases supporting high-dimensional vectors) to enable rapid similarity searches.

The new water injection control instruction refers to a new instruction for controlling the operation of the water injection device.

In some embodiments, the processor may instruct, based on the new water injection control instruction, the automation controller to control the water injection device to operate based on the updated water injection parameter.

In some embodiments of the present disclosure, by dynamically updating the water injection parameter based on the actual liquid production data and generating the new water injection control instruction, real-time optimization and closed-loop control of the water injection scheme are achieved, which enables timely adjustments to the water injection scheme based on actual production conditions, thereby further reducing energy consumption costs, improving water injection efficiency, and enhancing the adaptability and flexibility of oilfield development.

To demonstrate that multi-cycle pressure-separated oilfield water injection optimization can further reduce the total energy consumption and overall costs of the target water injection pipeline network, a domestic oilfield water injection pipeline network is used as an example. A comparative analysis of the total energy consumption of the oilfield water injection pipeline network under a conventional manner and a multi-cycle pressure-separated manner is conducted.

Figure 3:
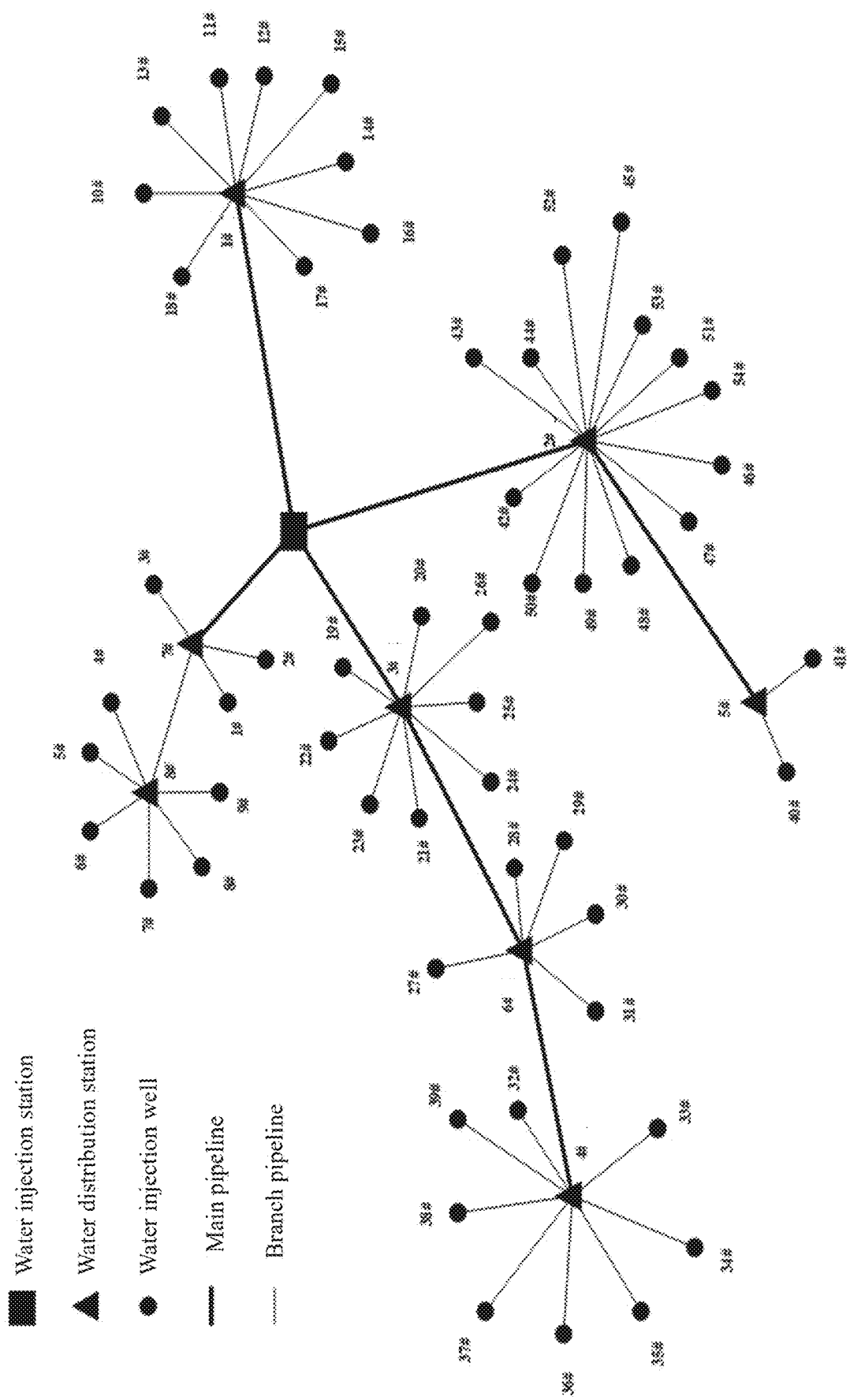
FIG. 3 is a schematic diagram of an exemplary water injection network according to some embodiments of the present disclosure.
Figure 4:
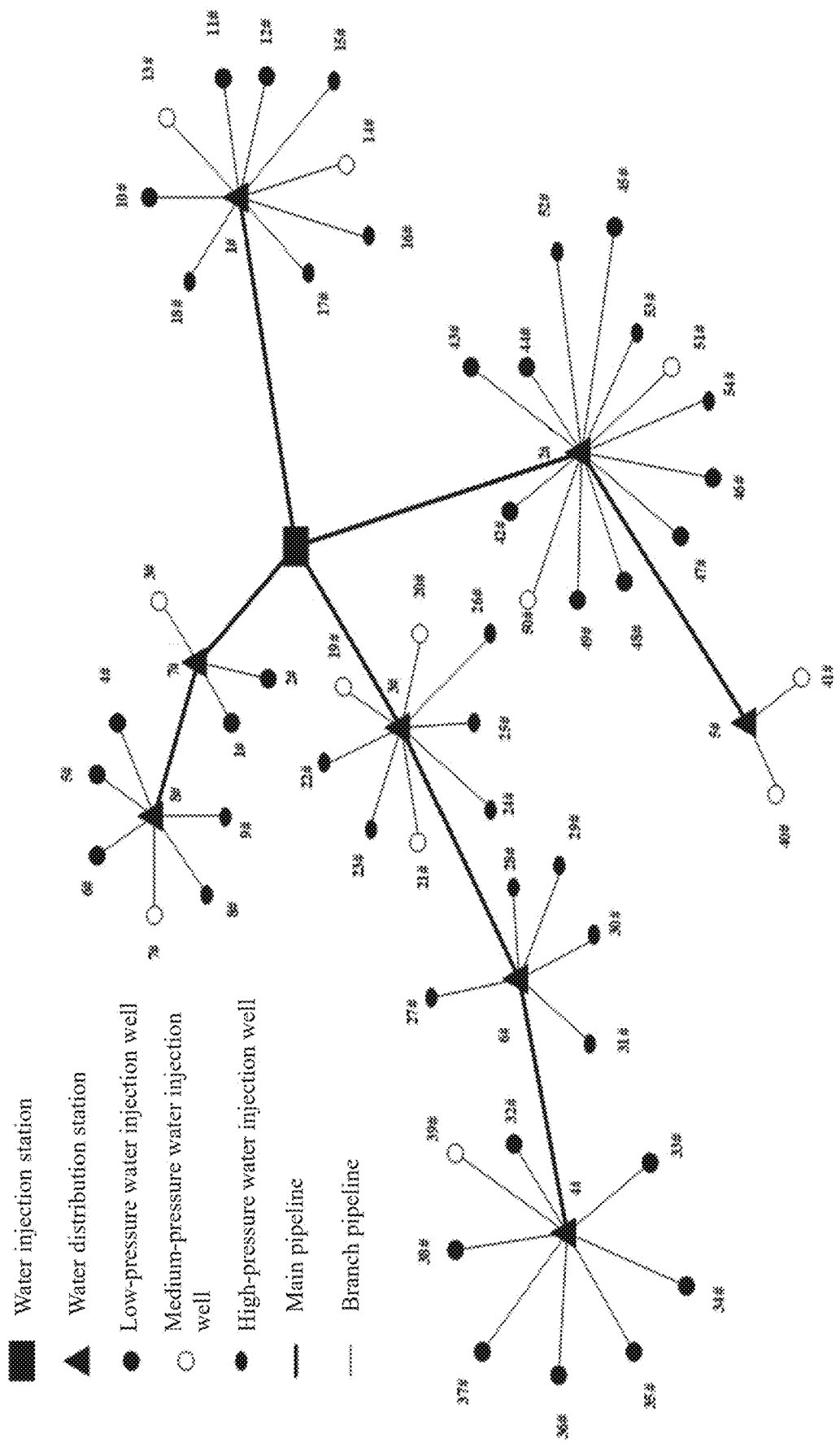
FIG. 4 is an exemplary schematic diagram of a water injection network after pressure zoning according to some embodiments of the present disclosure.
Figure 5:
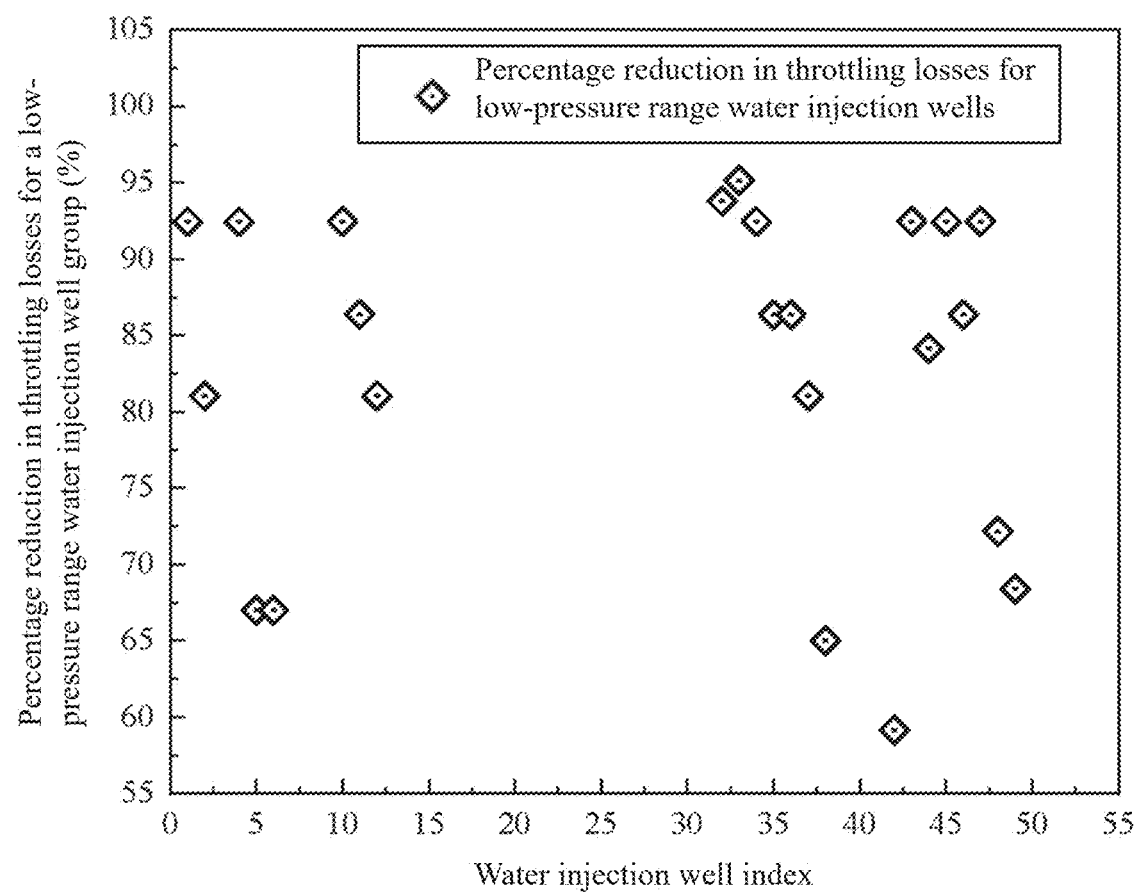
FIG. 5 is an exemplary schematic diagram illustrating a percentage reduction in throttling losses for a low-pressure range water injection well group according to some embodiments of the present disclosure.
Figure 6:
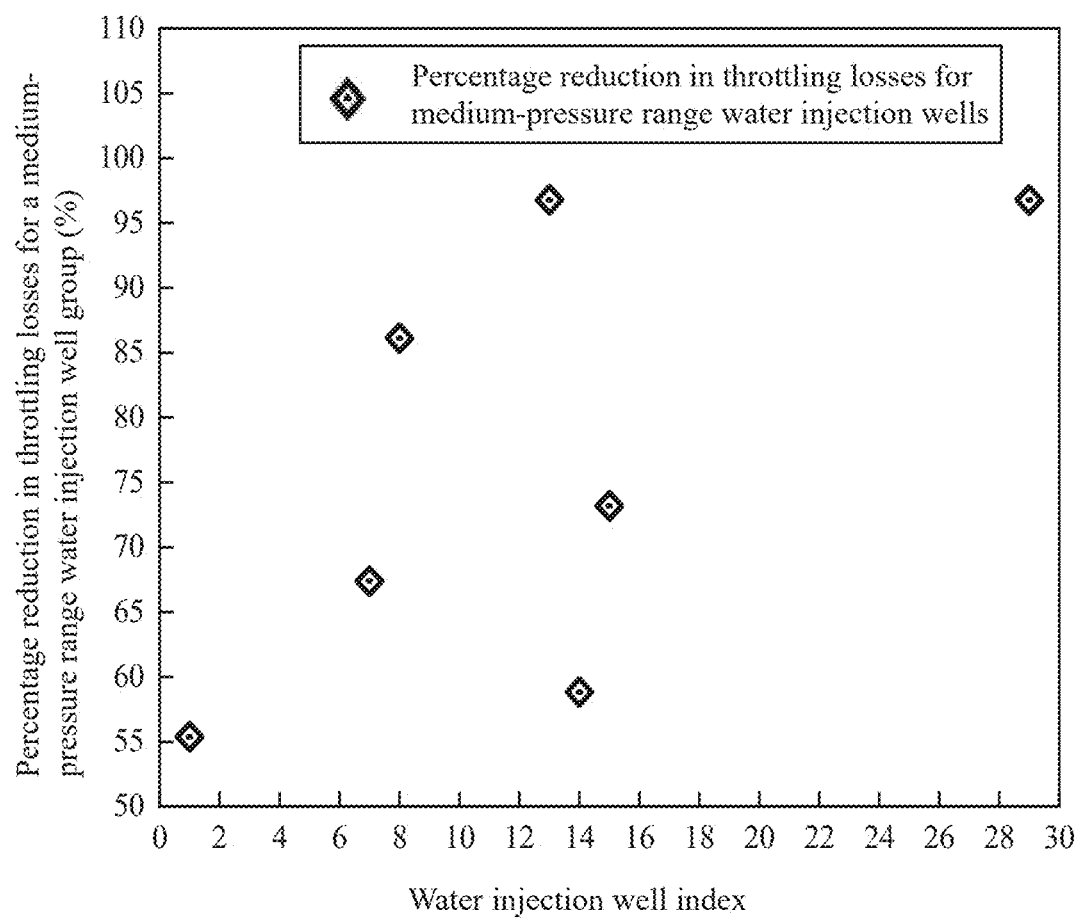
FIG. 6 is an exemplary schematic diagram illustrating a percentage reduction in throttling losses for a medium-pressure range water injection well group according to some embodiments of the present disclosure.

FIG. 3 is a schematic diagram of an exemplary water injection network according to some embodiments of the present disclosure. FIG. 4 is an exemplary schematic diagram of a water injection network after pressure zoning according to some embodiments of the present disclosure. FIG. 5 is an exemplary schematic diagram illustrating a percentage reduction in throttling losses for a low-pressure range water injection well group according to some embodiments of the present disclosure. FIG. 6 is an exemplary schematic diagram illustrating a percentage reduction in throttling losses for a medium-pressure range water injection well group according to some embodiments of the present disclosure.

The percentage reduction in the throttling loss refers to a reduction in the throttling loss after optimization compared to a conventional water injection manner.

Example 1: Conventional Manner Water Injection Pipeline Network

An optimization model for the conventional water injection mode was solved, and optimization results are shown in Table 7. In one water injection cycle (24 h), an average water injection volume (i.e., an average of flow rates of water injection pumps) was 501.67 m³/h, and a total energy consumption cost reached $58,198.73.

TABLE 7

Optimization Results of Water Injection Station Parameters

| Parameter | Result |
|---|---|
| Count of Operation Pumps | 2 |
| Flow Rate of 1#Pump (m³/h) | 249.77 |
| Flow Rate of 2#Pump (m³/h) | 251.90 |
| Speed Ratio of 1#Pump | 0.97 |
| Speed Ratio of 2#Pump | 0.97 |
| Efficiency of 1#Pump (%) | 72.0% |
| Efficiency of 1#Pump (%) | 72.6% |
| Total Power of Pump Unit (Kw) | 3233.26 |
| Total Energy Cost of Pump Unit (Yuan) | 58198.73 |

Example 2: Multi-Cycle Pressure-Separated Injection Network (1) Optimization Results A water injection scheme optimization model considering multi-cycle pressure-separated water injection was solved, and optimization results are shown in Table 8. It may be seen that in one water injection cycle (24 h), the low-pressure range water injection well group operated for 10.618 hours with an average water injection volume of 455.83 m³/h; the medium-pressure range water injection well group operated for 5.909 hours with an average water injection volume of 502.28 m³/h; and a high-pressure range water injection well group operated for 7.473 hours with an average water injection volume of 566.31 m³/h. Over the entire water injection cycle, the total energy consumption cost was reduced to 44,631.54 yuan. Compared to the conventional water injection manner, the total energy consumption cost of the multi-cycle pressure-separated water injection manner was reduced by 13,567.19 yuan.

TABLE 8

Parameter Optimization Results of Water Injection Station at Low, Medium, and High-Pressure Periods

| Parameter | Low-pressure | Medium-pressure | High-pressure |
|---|---|---|---|
| Injection Duration (h) | 10.62 | 5.91 | 7.47 |
| Count of Operation Pumps | 2 | 2 | 2 |
| Flow Rate of 1#Pump (M³/H) | 240.18 | 249.01 | 280.68 |
| Flow Rate of 2#Pump (M³/H) | 215.66 | 253.25 | 285.64 |
| Speed Ratio of 1#Pump | 0.75 | 0.87 | 0.98 |
| Speed Ratio of 2#Pump | 0.75 | 0.88 | 0.99 |
| Efficiency of 1#Pump (%) | 72.5% | 73.4% | 73.4% |
| Efficiency of 1#Pump (%) | 74.0% | 74.0% | 74.0% |
| Total Power of Pump Unit (Kw) | 1674.82 | 2535.77 | 3578.42 |
| Total Energy Cost of Pump Unit (Yuan) | | 44631.54 | |

(2) Comparison of Throttling Losses

After applying multi-cycle pressure-separated water injection to the target water injection pipeline network, the throttling losses caused by pressure mismatches were effectively reduced. Low-pressure range, medium-pressure range, and high-pressure range water injection well groups operated at independent system pressures. Compared to the conventional water injection manner, pressure differences before and after valves for the low-pressure range water injection well group and the medium-pressure range water injection well group were reduced, while the high-pressure range water injection well group continued to operate at a highest pressure of the water injection system, remaining unchanged. Specifically, an average pressure difference before and after the valves for the low-pressure range water injection well group was reduced by 82.95%, and an average pressure difference before and after the valves for the medium-pressure range water injection well group was reduced by 74.27%, as shown in FIG. 4 and FIG. 5

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, numbers describing the quantity of components and attributes are used. It should be understood that such numbers used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for optimizing multi-cycle pressure-separated water injection in an oilfield based on an improved butterfly algorithm, comprising:

S1: obtaining basic data of a target water injection pipeline network;

S2: constructing an objective function for a water injection scheme optimization model considering multi-cycle pressure-separated water injection; wherein the objective function is configured to minimize an energy consumption cost of a pump unit in the target water injection pipeline network, and the objective function is derived based on work performed by the pump unit on injected water during each water injection period, efficiencies of the pump unit, and an electricity price, represented by:

$$\min F = \sum_{i \in I_1, I_2, I_3} \sum_{j \in J} p_{ele} \frac{\gamma_{ij} Q_{ij} H_{ij} \rho g \Delta T_i}{\alpha \cdot \eta_{bij} \cdot \eta_{cij} \cdot \eta_{dij} \cdot \eta_{pij}}$$

wherein, i denotes an index of a water injection period within a water injection cycle, $I_1$, $I_2$, and $I_3$ denote sets of water injection periods for a low-pressure range water injection well group, a medium-pressure range water injection well group, and a high-pressure range water injection well group within the water injection cycle, respectively, j denotes an index of a water injection pump in a water injection station, J denotes a set of indices of water injection pumps in the water injection station, $P_{ele}$ denotes the electricity price, $\Delta T_i$ denotes a unit duration of each water injection period, $\gamma_{ij}$ denotes an on-off state of a j-th water injection pump in an i-th water injection period, $Q_{ij}$ denotes an outlet flow rate of the j-th water injection pump in the i-th period, $H_{ij}$ denotes an outlet head of the j-th water injection pump in the i-th water injection period, $\rho$ denotes an density of the injected water, g represents a gravitational acceleration, $\alpha$ denotes a unit conversion coefficient, $\eta_{bij}$ denotes an operating efficiency of the j-th water injection pump in the i-th water injection period, $\eta_{cij}$ denotes a transmission efficiency of the j-th water injection pump in the i-th water injection period, $\eta_{dij}$ denotes an efficiency of a motor of the j-th water injection pump in the i-th water injection period, $\eta_{pij}$ denotes a variable frequency efficiency of the motor of the j-th water injection pump in the i-th water injection period;

S3: establishing constraints to construct the water injection scheme optimization model considering multi-cycle pressure-separated water injection; and S4: solving the water injection scheme optimization model considering multi-cycle pressure-separated water injection using the improved butterfly algorithm to generate a multi-cycle pressure-separated water injection optimization scheme;

wherein, the water injection scheme optimization model considering multi-cycle pressure-separated water injection is a mixed-integer nonlinear programming model, and the water injection scheme optimization model is solved by performing operations including:

S401: based on the basic data of the target water injection pipeline network and the constraints, initializing parameters including a water injection duration of each water injection well, a count of operating pumps, an allocated flow rate of each water injection pump, a speed ratio of the each water injection pump, an efficiency of the each water injection pump, a total power of the pump unit, a total energy consumption cost of the pump unit, a cycle-level total power of the pump unit, and a cycle-level total energy consumption cost of the pump unit as an initial population of the improved butterfly algorithm using Circle chaotic mapping, the Circle chaotic mapping being represented by:

$$x_{\mu+1} = \mod\left(x_\mu + b^* - \left(\frac{a^*}{2\pi}\right)\sin(2\pi x_e), 1\right)$$

S402: randomly generating an initial position of each of butterfly individuals in a search space, and determining a fitness value and an initial fragrance intensity of the butterfly individual based on the position of the butterfly individual, wherein the fitness value is defined as the energy consumption cost of the pump unit in the target water injection pipeline network, the initial fragrance intensity is calculated by:

$$f = c^* \cdot R^\varphi$$

S403: setting a switching frequency P, and controlling the improved butterfly algorithm to perform global search or local exploitation, wherein during iterations, a random number rand within [0, 1] is generated and compared with the switching frequency P, if P>rand, the global search is performed, otherwise, the local exploitation is performed, the improved butterfly algorithm introduces an adaptive weight coefficient to improve an update equation for the global search and an update equation for the local exploitation, and the adaptive weight coefficient, the update equation for the global search, and the update equation for the local exploitation are represented by:

$$\sigma(t) = \sin\left(\frac{\pi t}{2t_{max}} + \pi\right)$$

$$x_v^{t+1} = \sigma(t)\left(x_v^t + (r^2 g' - x_v^t) \cdot f_v\right)$$

$$x_v^{t+1} = \sigma(t)\left(x_v^t + (r^2 x_{v1}^t - x_{v2}^t) \cdot f_v\right)$$

S404: updating individual optimal solutions and a global optimal solution during the iterations until a preset maximum iteration count is reached, and outputting an optimal solution obtained by the improved butterfly algorithm;

generating a water injection control instruction based on a water injection parameter in the multi-cycle pressure-separated water injection optimization scheme, and sending the water injection control instruction to an automated controller to instruct the automated controller to control a water injection device to perform water injection based on the water injection parameter;

wherein instructing the automated controller to control the water injection device to perform water injection based on the water injection parameter includes:

controlling the water injection pump, the motor of the water injection pump, and an auxiliary device to perform water injection, based on the water injection duration of the each water injection well, the count of operating pumps, the allocated flow rate of the each water injection pump, the speed ratio of the each water injection pump, the efficiency of the each water injection pump, and the total power of the pump unit in the target water injection pipeline network;

determining an oil production operation parameter of an oil production device based on the water injection parameter; and generating an oil production control instruction based on the oil production operation parameter, and sending the oil production control instruction to the automated controller to instruct the automated controller to control the oil production device to perform oil production based on the oil production operation parameter;

wherein instructing the automated controller to control the oil production device to perform oil production based on the oil production operation parameter includes:

controlling an operation of an oil pump based on a stroke of the oil pump, a stroke frequency, and a power of the oil pump;

controlling an opening of separators based on a count of activated separators; and controlling an oil transportation speed based on an oil transportation speed of an oil transportation pipeline.

2. The method of claim 1, wherein the multi-cycle pressure-separated water injection refers to a manner of grouping water injection wells with similar injection pressures, equipping the water injection wells with appropriate water injection pumps and water injection pipeline networks, and performing water injection for different pressure-range water injection well groups in different water injection periods.

3. The method of claim 1, wherein the basic data in S1 includes pipeline network structure data, a well operation parameter, a well location parameter, a station configuration parameter, a station location parameter, water injection cycle data, a pump operation parameter, and the electricity price.

4. The method of claim 1, wherein the constraints in S3 are divided into station-internal constraints and station-external constraints;

the station-internal constraints include:

a pump head constraint, which specifies a relationship between a head and a flow rate of the water injection pump under a variable frequency speed regulation, expressed by:

$$H_{ij} = k_{ij}^2 H_0 - S_j Q_{ij}^2$$

wherein, $H_{ij}$ denotes an outlet head of the j-th water injection pump in the i-th water injection period, $Q_{ij}$ denotes the outlet flow rate of the j-th water injection pump in the i-th water injection period, $k_{ij}$ denotes a speed ratio of the j-th water injection pump during the i-th water injection period; $H_0$ denotes a virtual total head when the flow rate is 0; $S_j$ denotes an internal virtual resistance coefficient of the j-th water injection pump;

a pump efficiency constraint, which specifies a relationship between an efficiency and the flow rate of the water injection pump under the variable frequency speed regulation, expressed by:

$$\eta_{bij} = a + \frac{b}{k_{ij}} Q_{ij} + \frac{c}{k_{ij}^2} Q_{ij}^2$$

wherein, $\eta_{bij}$ denotes the operating efficiency of the j-th water injection pump in the i-th water injection period;

$Q_{ij}$ denotes the outlet flow rate of the j-th water injection pump in the i-th water injection period; $k_{ij}$ denotes the speed ratio of the j-th water injection pump during the i-th water injection period; a, b, and c denote pump efficiency coefficients;

a speed ratio range constraint, which specifies that the speed ratio of the each water injection pump falls within a range, expressed by:

$$k_{ij}^{lo} \leq k_{ij} \leq k_{ij}^{up}$$

wherein, $k_{ij}^{lo}$ denotes a minimum speed ratio of the j-th water injection pump during the i-th water injection period; $k_{ij}^{up}$ denotes a maximum speed ratio of the j-th water injection pump during the i-th water injection period; $k_{ij}$ denotes the speed ratio of the j-th water injection pump during the i-th water injection period;

a single-pump flow constraint, which specifies that the flow rate of the each water injection pump during operation falls within a flow rate range of a high-efficiency zone, expressed by:

$$Q_{ij}^{lo} \leq Q_{ij} \leq Q_{ij}^{up}$$

wherein, $Q_{ij}^{lo}$ denotes a left critical flow point of the high-efficiency zone of the j-th water injection pump during the i-th water injection period; $Q_{ij}^{up}$ denotes a right critical flow point of the high-efficiency zone of the j-th water injection pump during the i-th water injection period; $Q_{ij}$ denotes the outlet flow rate of the j-th water injection pump in the i-th water injection period;

a parallel pump head constraint, which specifies that an outlet pressure of the each water injection pump is equal to an outlet pressure of the water injection station according to a principle of equal pressure in parallel pumps, expressed by:

$$H_i^{out} = H_{ij}$$

wherein, $H_i^{out}$ denotes an outlet head of the water injection station during the i-th water injection period; $H_{ij}$ denotes an outlet head of the j-th water injection pump in the i-th water injection period;

a parallel flow superposition constraint, which specifies that an outlet flow rate of the water injection station is equal to a sum of outlet flow rates of all water injection pumps in the water injection station according to a principle of flow superposition in parallel pumps, expressed by:

$$Q_i^{out} = \sum_{j \in J} Q_{ij}$$

wherein, $Q_i^{out}$ denotes an outlet flow rate of the water injection station during the i-th water injection period; $Q_{ij}$ is the outlet flow rate of the j-th water injection pump in the i-th water injection period; J denotes the set of indices of the water injection pumps in the water injection station; and a cycle coverage constraint, which specifies that a union of the sets of the water injection periods for the low-pressure range water injection well group, the medium-pressure range water injection well group, and the high-pressure range well group covers the entire water injection cycle, expressed by:

$$I_1 \cup I_2 \cup I_3 = I$$

wherein, $I_1$, $I_2$, $I_3$ denotes the sets of water injection periods for the low-pressure range water injection well group, medium-pressure range water injection well group, and high-pressure range water injection well group within the water injection cycle, respectively; I denotes the entire water injection cycle;

the station-external constraints include:

a minimum wellhead constraint, which specifies that the outlet head of the water injection station satisfies a requirement of a highest-head water injection well, expressed by:

$$H_i^{out} \geq H_w^{standard} + H_{wf} + \Delta h_w$$

wherein, $H_i^{out}$ denotes the outlet head of the water injection station during the i-th water injection period; $H_w^{standard}$ denotes a required water injection head for a with water injection well; $H_{wf}$ denotes a total frictional resistance loss of the w-th water injection well; $\Delta h_w$ denotes an elevation difference between the w-th water injection well and the water injection station;

a pipeline frictional resistance constraint, which specifies that for a pipeline element with nodes m and n, if a flow direction is m→n, the pipeline element satisfies an energy equation expressed by:

$$\Delta H_l = H_m - H_n = 10.67 \frac{Q_l^{1.852} L_l}{C^{1.852} d_l^{4.87}}$$

wherein, $\Delta H_l$ denotes an absolute value of a frictional resistance loss of a pipeline segment l; $H_m$, denotes a head at the node m; $H_n$ denotes a head at the node n; $Q_l$ denotes an absolute value of a flow rate in the pipeline segment l; $d_l$ denotes a diameter of the pipeline segment l; $L_l$ denotes a length of the pipeline segment l; C denotes a calculation coefficient;

a node flow rate constraint, which specifies that all nodes in the target water injection pipeline network satisfy a node flow balance, in other words, for each of the nodes in the target water injection pipeline network, a flow rate into the node is equal to a flow rate out of the node at any time, the node flow rate constraint is expressed by:

$$q_m + \sum_{l \in L} \beta_{ml} Q_{ml} = 0$$

wherein, $q_m$ denotes a flow rate at the node m; $Q_{ml}$ denotes a flow rate in the pipeline segment l connected to the node m; $\beta_{ml}$ denotes a flow direction coefficient of the pipeline segment l connected to the node m; L denotes a set of pipeline segments connected to the node m; and a total water injection balance constraint, which specifies that the entire target water injection pipeline network satisfies a system supply-demand flow rate balance, in other words, a sum of outlet flow rates of the water injection station during each water injection period in the entire water injection cycle is equal a sum of daily demand volumes and daily leakage volumes of all water injection wells in the target water injection pipeline network, the total water injection balance constraint is expressed by:

$$\sum_{i \in I} Q_i^{out} = \sum_{i \in I} \sum_{w \in W} Q_{wi} + \Delta Q$$

wherein, $Q_i^{out}$ denotes the outlet flow rate of the water injection station during the i-th water injection period; $Q_{wi}$ denotes a required water injection volume for the w-th water injection well during the i-th water injection period; I denotes the entire water injection cycle; W denotes a set of all the water injection wells in the target water injection pipeline network; $\Delta Q$ denotes a total flow loss within the water injection cycle.

5. The method of claim 1, wherein the multi-cycle pressure-separated water injection optimization scheme includes the water injection duration of the each water injection well, the count of operating pumps, the allocated flow rate of the each water injection pump, the speed ratio of the each water injection pump, the efficiency of the each water injection pump, the total power of the pump unit, the total energy consumption cost of the pump unit, the cycle-level total power of the pump unit, and the cycle-level total energy consumption cost of the pump unit.

6. The method of claim 1, wherein the determining an oil production operation parameter of an oil production device based on the water injection parameter includes:
    acquiring an oil production characteristic through a feature acquisition device;
    determining an estimated liquid production volume via a liquid production estimation model based on the oil production characteristic, the water injection parameter, and a water injection well distribution characteristic, wherein the liquid production estimation model is a machine learning model; and
    determining the oil production operation parameter based on the estimated liquid production volume.

7. The method of claim 6, wherein the liquid production estimation model is obtained by training with a training sample set;
    the training sample set includes a plurality of groups of training samples and training labels corresponding to the groups of training samples;
    each of the plurality of groups of training samples includes a sample production characteristic, a sample water injection parameter, a sample distribution characteristic, sample dimensional data, a sample property characteristic, and a sample geological characteristic corresponding to a sample oil well; and
    a proportion of the training samples corresponding to each sample oil well in the training sample set is not less than a predetermined threshold corresponding to the each sample oil well, wherein the predetermined threshold is determined based on an oil complexity level and a geological complexity level of the each sample oil well.

8. The method of claim 1, further comprising:
    acquiring actual liquid production data through a monitoring device after the automated controller controls the water injection device to perform the water injection based on the water injection parameter, wherein the actual liquid production data includes an actual liquid production volume and a produced liquid water content;
    updating the water injection parameter based on the actual liquid production data; and
    generating a new water injection control instruction based on an updated water injection parameter, and sending the new water injection control instruction to the automated controller to instruct the automated controller to control the water injection device to perform the water injection based on the updated water injection parameter;
    wherein instructing the automated controller to control the water injection device to perform the water injection based on the updated water injection parameter includes:
        controlling the water injection pump, the motor of the water injection pump and the auxiliary device to perform the water injection, based on an updated water injection duration of the each water injection well, an updated count of operating pumps, an updated allocated flow rate of the each water injection pump, an updated speed ratio of the each water injection pump, an updated efficiency of the each water injection pump, an updated total power of the pump unit in the target water injection pipeline network.

9. The method of claim 1, wherein the switching frequency is dynamically adjusted through a frequency adjustment model based on a current iteration count, a historical objective function value, a diversity of historical solutions, a population state characteristic, water injection pipeline network data, and well production data; wherein
    the frequency adjustment model is a trained Recurrent Neural Network (RNN); the frequency adjustment model is trained based on a large number of first training samples with first labels; a group of first training samples includes a current iteration count corresponding to a first historical moment in the historical data, a historical objective function value, a diversity of historical solutions, a historical population state characteristic, historical water injection pipeline network data, and historical well production data at a second historical moment; the first historical moment is after the second historical moment; the first labels corresponding to the group of first training samples include a set of switching frequencies P values that maximize a change of a subsequent objective function value and finds an optimal solution; and
    a process of training the frequency adjustment model includes:
        inputting a plurality of the first training samples with the first labels into an initial frequency adjustment model, constructing a first loss function using the first labels and outputs of the initial frequency adjustment model, and training the initial frequency adjustment model based on the first loss function to obtain a trained frequency adjustment model; and completing the training when a preset condition is satisfied.

* * * * *